US 6,693,759 B2

(12) United States Patent
Owens et al.

(10) Patent No.: US 6,693,759 B2
(45) Date of Patent: Feb. 17, 2004

(54) COMPACT FORM FACTOR FOR AN AUTOMATED TAPE CARTRIDGE AUTOLOADER/LIBRARY SYSTEM

(75) Inventors: John C. Owens, Arvada, CO (US); Paddy Eliot Collins, Colorado Springs, CO (US); Ryan Stuart Porter, Monument, CO (US); Peter A. Johnson, Black Forest, CO (US); Alexander Chan, Colorado Springs, CO (US); Kim M. Thomas, Colorado Springs, CO (US); Christopher Lee Felton, Colorado Springs, CO (US); David Ray Berry, Colorado Springs, CO (US); Thua Nang Dai, Colorado Springs, CO (US); Dominic John Maglia, Pueblo, CO (US); Theodore James Oade, Colorado Springs, CO (US); Scott Ryan Patterson, Manitou Springs, CO (US); Gary Eugene Sadler, Colorado Springs, CO (US); Sam Wen, Superior, CO (US)

(73) Assignee: Quantum Corporation, San Jose, CA (US)

( * ) Notice: Subject to any disclaimer, the term of this patent is extended or adjusted under 35 U.S.C. 154(b) by 398 days.

(21) Appl. No.: 09/895,816

(22) Filed: Jun. 29, 2001

(65) Prior Publication Data

US 2002/0057515 A1 May 16, 2002

Related U.S. Application Data

(63) Continuation-in-part of application No. 09/710,645, filed on Nov. 10, 2000.

(51) Int. Cl.⁷ .......................... G11B 17/00; G11B 15/68
(52) U.S. Cl. .......................................... 360/69; 360/92
(58) Field of Search .............................. 360/69, 71, 92; 414/932; 242/337, 337.1; 700/214

(56) References Cited

U.S. PATENT DOCUMENTS

| 4,063,294 A | 12/1977 | Burkhart ....................... 360/92 |
| 4,910,619 A | 3/1990 | Suzuki et al. .................. 360/92 |
| 4,981,409 A | 1/1991 | Hirose et al. ................ 414/225 |

(List continued on next page.)

FOREIGN PATENT DOCUMENTS

| DE | 37 21821 C1 | 10/1988 |
| EP | 0 334 257 A2 | 9/1989 |
| EP | 0 426 456 B1 | 5/1991 |

(List continued on next page.)

OTHER PUBLICATIONS

Material from Worldwide Web @ www.m4data–usa.com/products/magfile_1.html, May 17, 2001.

Primary Examiner—Andrew L. Sniezek
(74) Attorney, Agent, or Firm—Morrison & Foerster LLP

(57) ABSTRACT

A tape cartridge autoloader library system including at least one read/write tape drive, a tape cartridge picker, a single tape cartridge interface, and a pair of tape cartridge magazines within a compact form factor that fits into a standard library rack mount. The autoloader/library system is a complete tape cartridge library that stores, manages, and automatically exchanges a plurality of tape cartridges between the tape drive, the single cartridge interface, and the pair of tape cartridge magazines. The tape cartridge magazines are each configured to receive and store a plurality of individual tape cartridges in a horizontal relationship. The tape cartridge magazines transport the individual tape cartridges within the tape cartridge magazines so that an individual one of the tape cartridges is in position for selection by the cartridge picker. The cartridge picker rotates to exchange tape cartridges between one of the tape drive, the pair of tape cartridge magazines, and/or the single tape cartridge interface. The single cartridge interface exchanges individual tape cartridges between an operator and the autoloader/library system.

34 Claims, 40 Drawing Sheets

U.S. PATENT DOCUMENTS

| | | | |
|---|---|---|---|
| 5,089,920 A | 2/1992 | Bryer et al. | 360/92 |
| 5,293,284 A | 3/1994 | Sato et al. | 360/92 |
| 5,402,285 A * | 3/1995 | Theobald, Jr. et al. | 360/69 |
| 5,449,091 A | 9/1995 | Dalziel | 221/81 |
| 5,469,310 A | 11/1995 | Slocum et al. | 360/92 |
| 5,515,213 A | 5/1996 | Elliott | 360/92 |
| 5,537,378 A | 7/1996 | Uehara et al. | 369/77.2 |
| 5,631,785 A | 5/1997 | Dang et al. | 360/92 |
| 5,682,276 A | 10/1997 | Hinnen et al. | 360/92 |
| 5,746,385 A | 5/1998 | Leger et al. | 242/337 |
| 5,752,668 A | 5/1998 | Patterson et al. | 242/337 |
| 5,760,995 A | 6/1998 | Heller et al. | 360/92 |
| 5,793,564 A | 8/1998 | Nakase et al. | 360/92 |
| 5,847,897 A | 12/1998 | Marlowe | 360/92 |
| 5,856,894 A | 1/1999 | Marlowe | 360/92 |
| 5,959,803 A | 9/1999 | Okamoto et al. | 360/92 |
| 5,975,450 A | 11/1999 | Leger et al. | 242/337 |
| 5,999,356 A | 12/1999 | Dimitri et al. | 360/71 |
| 6,097,566 A | 8/2000 | Heller et al. | 360/92 |
| 6,130,800 A | 10/2000 | Ostwald | 360/92 |
| 6,381,089 B1 * | 4/2002 | Helmick et al. | 360/92 |

FOREIGN PATENT DOCUMENTS

| | | |
|---|---|---|
| EP | 0 578 536 A3 | 1/1994 |
| EP | 0 725 398 B1 | 8/1996 |
| EP | 1 045 382 A3 | 10/2000 |
| JP | 62 134852 | 6/1987 |
| JP | 62 239372 | 10/1987 |
| JP | 06 052657 | 2/1994 |
| WO | WO 89/08311 | 8/1989 |
| WO | WO 01/0988 A1 | 2/2001 |
| WO | WO 02/11135 A1 | 2/2002 |

* cited by examiner

COMPACT FORM FACTOR FOR AN AUTOMATED TAPE CARTRIDGE AUTOLOADER/LIBRARY SYSTEM

CROSS REFERENCE TO RELATED APPLICATIONS

This application is a continuation in part of U.S. patent application Ser. No. 09/710,645 filed on Nov. 10, 2000, titled "Automated Tape Cartridge Autoloader/Library System," pending and which is incorporated herein by reference in its entirety.

FIELD OF THE INVENTION

The invention is related to the field of data storage, and in particular, to a tape cartridge library for managing, storing, and providing a plurality of tape cartridges for access to at least one tape drive.

BACKGROUND OF THE INVENTION

A popular device for handling large amounts of information in a data processing system is an automated tape cartridge library. Tape cartridge libraries store and manage multiple tape cartridges containing magnetic tape media on which data is stored. Tape cartridge libraries typically include a plurality of fixed tape cartridge storage locations, at least one read/write tape drive, and a tape cartridge retrieval/transport mechanism, known in the art as a "cartridge picker."

Unfortunately, tape cartridge libraries suffer from numerous drawbacks. One major drawback in tape libraries is their overall size, primarily due to the necessity of storing and managing the large number of tape cartridges. In tape libraries, the tape cartridge storage locations are arranged in predetermined arrays of uniquely identified cells with each cell containing a single tape cartridge. In some cases, the array of cells is configured in a bookshelf arrangement. This type of arrangement, however, requires the use of a multi-axis cartridge picker that translates along an x, y, and/or z axis to exchange the individual tape cartridges with a tape drive(s).

In other cases, such as disclosed in U.S. Pat. No. 5,847,897, the array of cells is vertically oriented in a carousel style cartridge magazine that rotates about a central axis to position tape cartridges for selection by a stationary cartridge picker. Unfortunately, the vertical orientation of the tape cartridges in the magazine, while necessary to the operation of the carousel, and use of a stationary cartridge picker, significantly adds to the overall height and size of the library. Additionally, the vertical orientation of the tape cartridges requires that the tape drive(s) also be vertically oriented to permit the picker to pass a tape cartridge from the magazine to the drive without a complicated re-orientation of the cartridge that would result in the need for additional space within the library.

The cartridge picker is another factor contributing to the size of tape library systems. Cartridge pickers automatically exchange the individual tape cartridges between their storage locations and the tape drive. Different types of pickers accommodate various tape cartridge arrangements in different tape cartridge libraries. One example of a tape cartridge picker utilizes a rotatable robotic arm with an optical sensor for selecting and retrieving the correct tape cartridge and transporting the tape cartridge to a tape drive. Another example of a tape cartridge picker utilizes a linear robotic mechanism that moves along an X-Y translation or about a pivot in a rotary motion to select, retrieve, and transport tape cartridges to a tape drive. Unfortunately, tape cartridge pickers are complex mechanisms that require a significant amount of space to maneuver and translate among the multitude of storage locations to retrieve and deliver tape cartridges to tape drives.

SUMMARY

The present invention solves the problems outlined above and advances the art by providing a tape cartridge library system, termed "autoloader/library system" herein. The present autoloader/library system includes at least one read/write tape drive, a tape cartridge picker, a single tape cartridge interface, and a pair of tape cartridge transport magazines within a compact and volumetrically efficient form factor that fits into a conventional library rack mount cabinet. The autoloader/library system is a complete tape cartridge library that stores, manages, and automatically exchanges a plurality of tape cartridges between the tape drive, the single cartridge interface, and the tape cartridge transport magazines. In one example of the present invention the autoloader/library system is configured to store and manage sixteen tape cartridges in a form factor measuring less than three and one half inches high, less than twenty eight inches deep, and less than eighteen inches wide.

The autoloader/library system can function as a traditional tape cartridge library where the plurality of tape cartridges stored in the magazine(s) are managed by the autoloader/library system, or the autoloader/library system can function to present a plurality of scratch (blank) tapes to the tape drive(s) for the writing of data thereon. In this latter application, the magazine functions to queue a plurality of scratch tapes for the tape drive(s) so that data can be written on each of the scratch tapes without the necessity of an operator having to manually load scratch tapes into the tape drive(s).

The autoloader/library system is architected such that the components are substantially coplanar. In one example of the present invention, a pair of tape cartridge transport magazines is utilized to receive and store a plurality of individual tape cartridges in a horizontal relationship. The magazines transport the individual tape cartridges in a vertical closed loop within the magazines so that individual tape cartridges can be positioned for selection by the cartridge picker. Advantageously, the cartridge picker does not translate in three dimensions as in prior art tape cartridge library systems, but instead simply rotates within a stationary picker base to position for the exchange of tape cartridges with the tape drive, the tape cartridge transport magazines, and a single tape cartridge interface. The single tape cartridge interface is configured to exchange tape cartridges between the autoloader/library system and an operator.

The autoloader/library system is also configured to mechanically and electrically interconnect with other substantially identical autoloader/library systems by stacking multiple autoloader/library systems to provide expandability and scalability as a matter of design choice. Once stacked, the multiple autoloader/library systems could each include their own tape cartridge transport magazines, tape drive, and cartridge picker or could share elements such as the single tape cartridge interface, tape cartridge transport magazines, tape drives and cartridge pickers. In addition, stacked autoloader/library systems may also share tape cartridges to provide efficient load balancing and operation.

A first advantage of the present autoloader/library system is the use of the transport mechanisms in the tape cartridge transport magazines to position tape cartridges for selection by the cartridge picker. This significantly limits the amount of the travel and space required to operate the cartridge picker. The cartridge picker simply rotates between the tape cartridge transport magazines, the tape drive, and the single cartridge interface to provide a fast efficient exchange of tape cartridges. A second advantage of the present autoloader/library system is the horizontal orientation of the cartridges in the magazines that permit coplanar components in the autoloader/library system to facilitate the compact form factor. A third advantage of the present autoloader/library system is the independent operation of the magazines, cartridge picker, tape drive, and single cartridge interface. During operation, the magazine(s) can inventory or queue cartridges for retrieval by the picker while the picker shuttles tape cartridges between various locations in the autoloader/library system and the tape drive(s) read and write data to a tape cartridge. A fourth advantage of the present tape cartridge transport magazine is that the tape cartridge transport magazines are interchangeable so that any one of the magazines will interface with any one of multiple magazine ports. A fifth advantage of the present autoloader/library system is the expandability and scalability provided by stacking multiple autoloader/library systems to expand capacity.

DETAILED DESCRIPTION

Figure 1A:
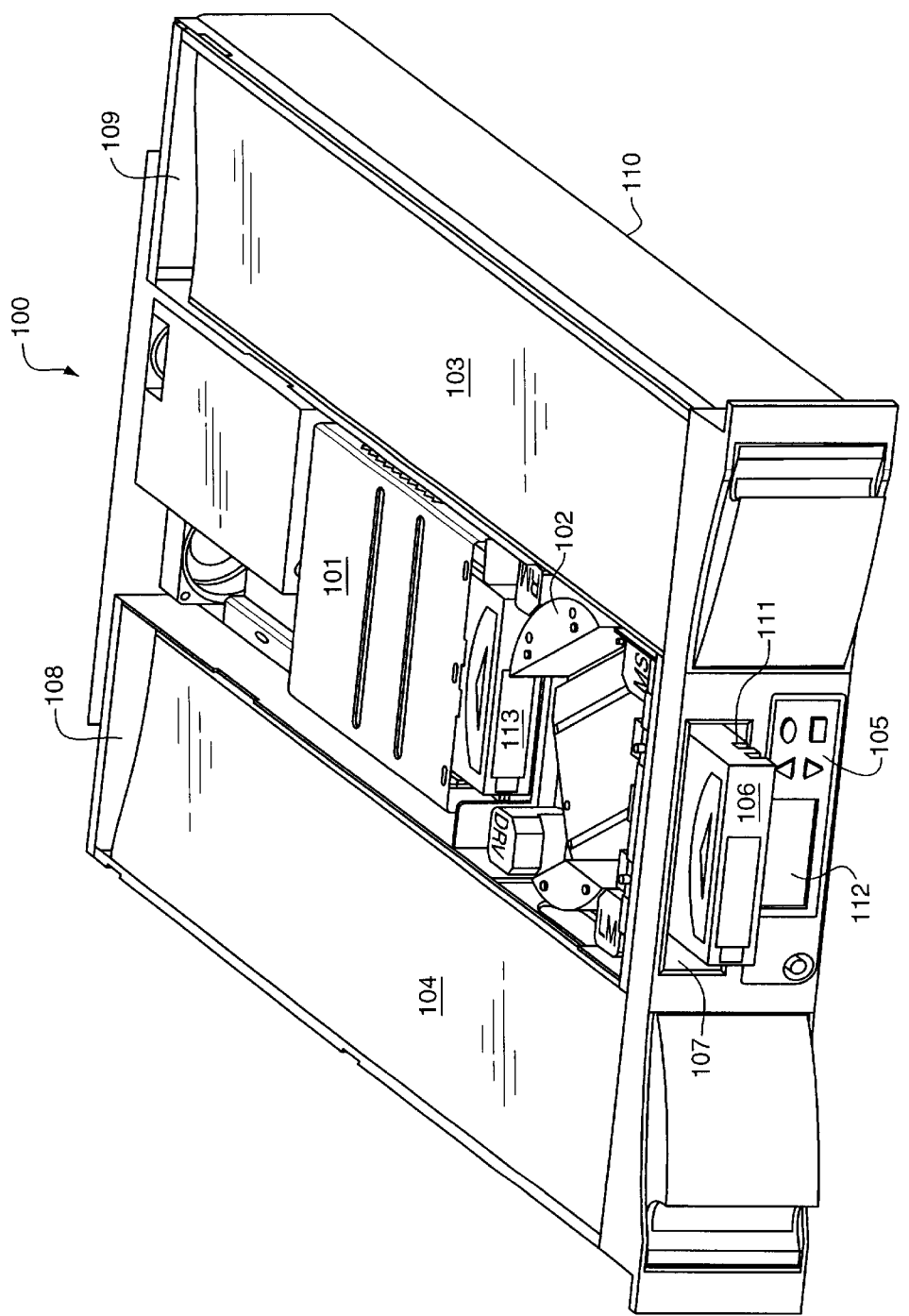
FIG. 1a illustrates a perspective view of a tape cartridge autoloader/library system according to the present invention.
Figure 1C:
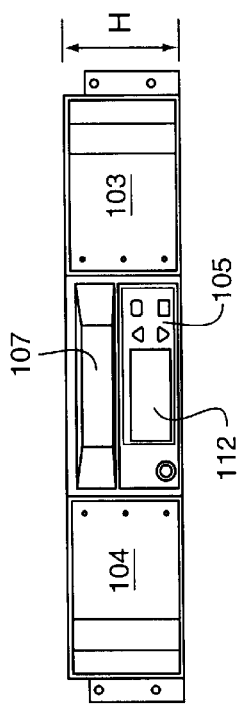
FIG. 1c illustrates a front view of a tape cartridge autoloader/library system according to the present invention.
Figure 1B:
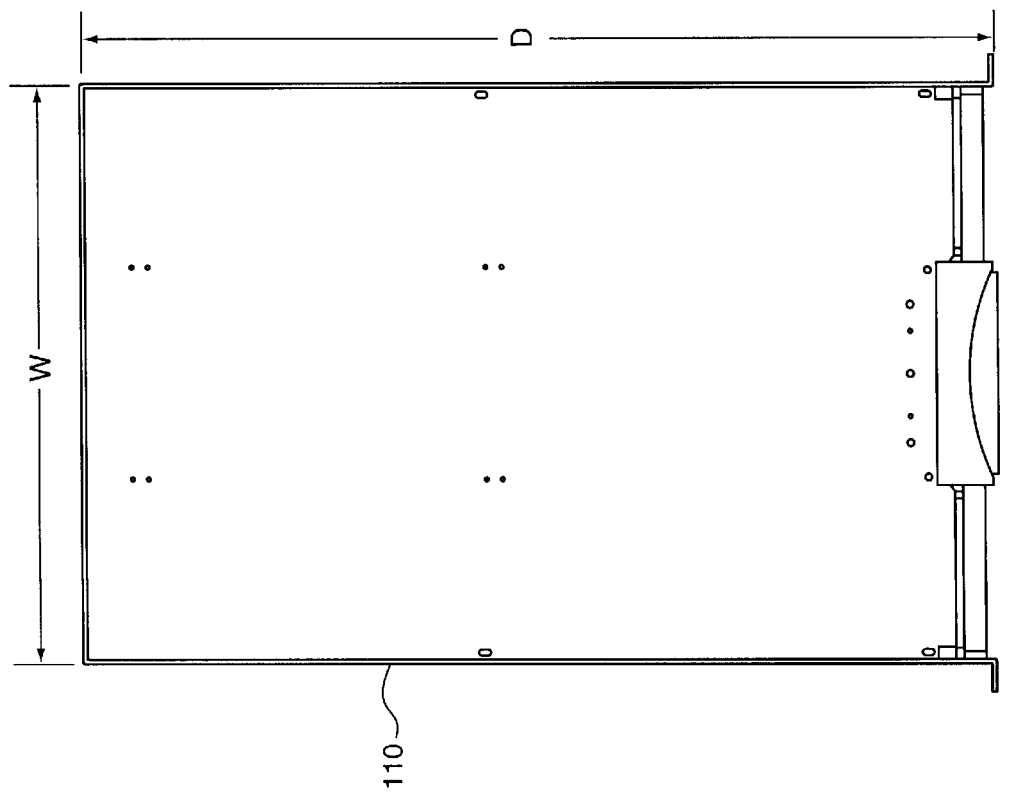
FIG. 1b illustrates a top view of a tape cartridge autoloader/library system according to the present invention.

Automated Tape Cartridge Autoloader/Library System—FIGS. 1a and 1b:

For purposes of illustration and not of limitation, various features and advantages of the present autoloader/library system will now be described within the context of an autoloader/library system configured to accommodate a plurality of DLT tape cartridges. It is to be understood that the following description with respect to the example of an autoloader/library system configured for DLT tape cartridges is not intended to limit the scope of the present invention. It would be obvious to one skilled in the art that the principles of the present invention could easily be applied to other tape cartridge formats.

FIG. 1a depicts an automated tape cartridge autoloader/library system according to the present invention, namely automated autoloader/library system 100. The primary components of the autoloader/library system 100 are a read/write tape drive 101, a tape cartridge picker 102, a single tape cartridge interface 107, and a pair of tape cartridge transport magazines, 103 and 104, enclosed in a housing 110. The autoloader/library system 100 also comprises a control panel 105 that receives control inputs from an operator and a user interface 112 to provide status information to the operator.

The autoloader/library system 100 incorporates various features and aspects that improve over prior art tape cartridge libraries and autoloaders to provide a fully upgradable and scalable autoloader/library system in a compact and volumetrically efficient form factor. The autoloader/library system 100 is a complete tape cartridge library that stores, manages, and automatically exchanges a plurality of tape cartridges, e.g. 106 and 113, between the tape drive 101, the single cartridge interface 107, and the tape cartridge transport magazines, 103 and 104. Advantageously, the principals of the present autoloader/library system 100 could easily be applied to any tape cartridge media as a matter of design choice by simply incorporating the appropriate tape drive format into the autoloader/library system 100. Additionally, the autoloader/library system 100 could include multiple tape drives as a matter of design choice although only tape drive 101 is shown for clarity. Some examples of the tape cartridge media 106 could include without limitation, DLT, LTO, 8 millimeter, and S-DLT tape cartridges.

Referring to FIGS. 1b–c, a significant advantage of the autoloader/library system 100 is the compact form factor. In one example of the present autoloader/library system 100, the housing 110 including the tape cartridge transport magazines, 103 and 104, the tape drive 101, the cartridge picker 102, and all control elements including motors, circuitry, and processors comprises a height (H) measuring only 3.48 inches, a depth (D) measuring only 27.984 inches and a width (W) measuring only 17.6 inches. The storage and management of the plurality of tape cartridges in the compact form factor of the autoloader/library system 100 is primarily provided by the cartridge picker 102 and the individual tape cartridge transport magazines, 103 and 104. The tape cartridge transport magazines, 103 and 104, each receive and store a plurality of individual tape cartridges, e.g. 106, in a plurality of individual tape cartridge storage locations. As will become apparent from the following description, in one example of the autoloader/library system, the magazines, 103 and 104, each accommodate eight DLT tape cartridges within the above described form factor.

Operationally, the cartridge picker 102 rotates to position for the exchange of individual tape cartridges, e.g. 106 and 113, with one of the tape drive 101, the tape cartridge transport magazine 103, the tape cartridge transport magazine 104, and the single tape cartridge interface 107. The tape cartridge transport magazines, 103 and 104, transport the tape cartridges in a vertical closed loop within the tape cartridge transport magazines, 103 and 104, to position individual cartridges for selection by the cartridge picker 102. Advantageously, the use of the transport mechanisms in the magazines, 103 and 104, to position tape cartridges for selection by the cartridge picker 102 significantly limits the travel required for operation of the cartridge picker 102. Rather than move to the location of a desired tape cartridge 106, select the tape cartridge 106 from the location, and then move to the location of the tape drive 101 as in the prior art, the cartridge picker 102 simply rotates between the tape cartridge transport magazines, 103 and 104, the single cartridge interface 107, and the tape drive 101 to provide a fast efficient exchange of tape cartridges. Furthermore, the transport mechanisms in the tape cartridge transport magazines, 103 and 104, permit the magazines, 103 and 104, the tape drive 101, the single cartridge interface 107, and the picker 102 to be coplanar, further facilitating the compact form factor. Still yet another advantage of the present autoloader/library system 100, is that tape cartridges are not flipped or re-oriented during transport within the magazines, 103 and 104. During transport, the tape cartridges are always maintained in the proper orientation for retrieval by the cartridge picker 102 and for presentation to the tape drive 101, single cartridge interface 107, and other tape cartridge magazines.

Once selected by the cartridge picker 102, an individual tape cartridge, e.g. 106, could be provided to one of the following locations depending on the desired operation to be performed. If a read/write operation is desired, the cartridge picker 102 could provide the selected tape cartridge 106 to the tape drive 101. If an ejection operation is desired, the cartridge picker 102 could provide the selected tape cartridge 106 to the single tape cartridge interface 107 for retrieval by an operator. If a load balancing operation is desired, the cartridge picker 102 could exchange the tape cartridge 106 between the tape cartridge transport magazine 103 and the tape cartridge transport magazine 104. Finally, as will become apparent from the following description, the cartridge picker 102 could also provide the selected tape cartridge 106 to another tape cartridge transport magazine, another single cartridge interface, or another tape drive in a coupled tape cartridge autoloader/library system.

Figure 2:
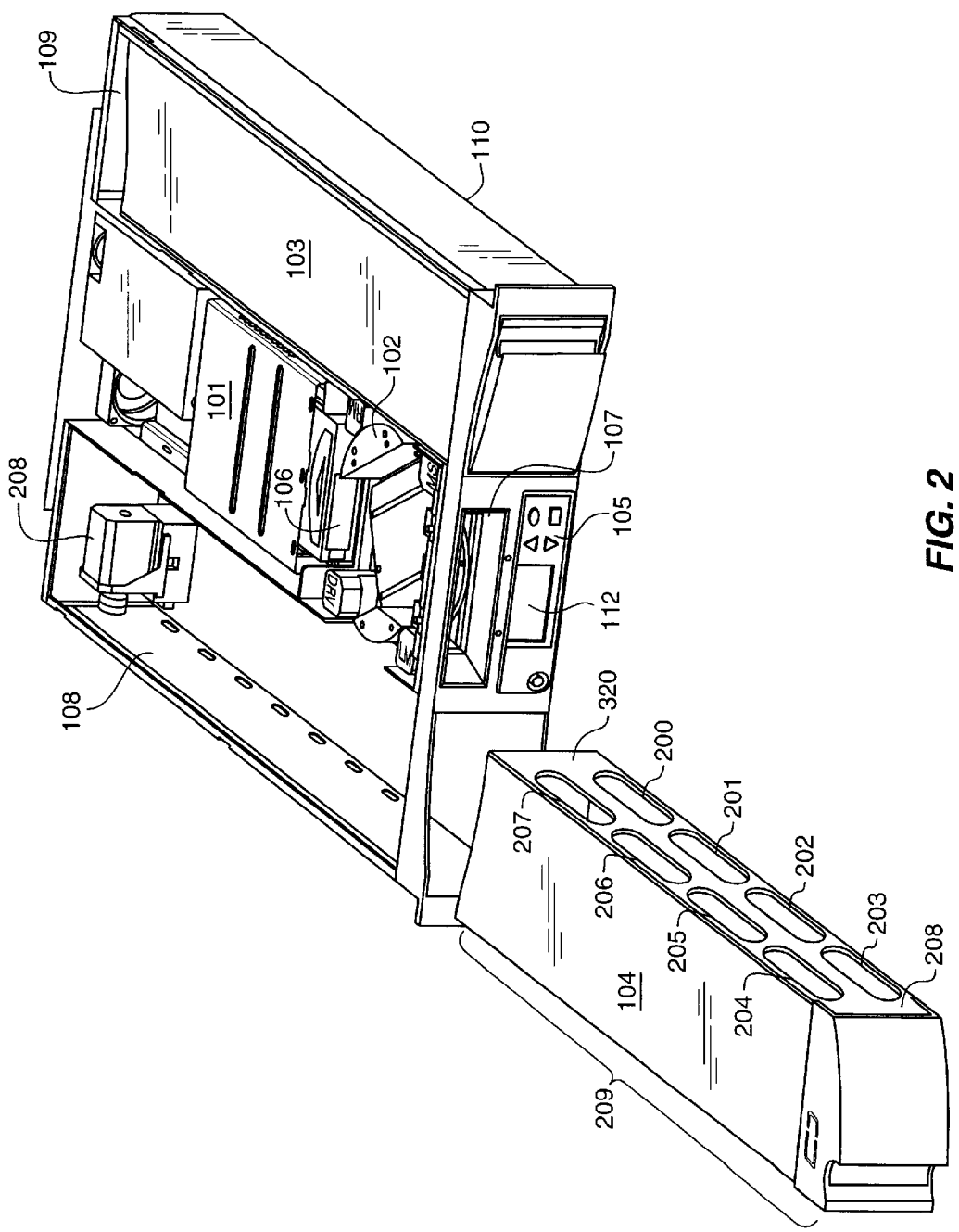
FIG. 2 illustrates an example of the tape cartridge autoloader/library system according to the present invention with a tape cartridge transport magazine in an ejected position.

The Tape Cartridge Transport Magazines—FIGS. 2–10:

The following description is primarily in reference to the tape cartridge transport magazine 104 but is equally applicable to the tape cartridge transport magazine 103. FIG. 2 depicts the autoloader/library system 100 with the tape cartridge transport magazine 104 in the ejected position. The tape cartridge transport magazine 104 is designed to receive a plurality of tape cartridges in a plurality of storage locations 200–207 contained in a housing 209. These storage locations 200–207 are "virtual" storage locations in that they are not physically delimited spaces within the tape cartridge transport magazine 104, but are representative of the position of the tape cartridges within the magazine 104 when the magazine 104 is equipped with a full complement of tape cartridges. Therefore, the illustration of FIG. 3 is where eight cartridges are loaded in the tape cartridge transport magazine 104 and oriented four cartridges in a top row, above four cartridges in a bottom row. It should be noted that while the tape cartridge transport magazine 104 is shown with eight storage locations 200–207, the magazines, 103 and 104, could be configured with more or less than the eight storage locations as a matter of design choice and type of tape cartridge accommodated. Additionally, it is not necessary that both the tape cartridge transport magazines, 103 and 104, have the same number of storage locations 200–207. One of the tape cartridge transport magazines, 103 and 104, could contain more or less storage locations than the other one of the tape cartridge transport magazine, 103 and 104. Finally, one of the tape cartridge transport magazines, 103 and 104, could be configured for one type of tape media, e.g. DLT tape media, while the other one of the tape cartridge transport magazines, 103 and 104, could be configured for another type of tape media, e.g. LTO tape media. Those skilled in the art will appreciate that this would require that additional tape drives of the appropriate format be included in the autoloader/library system 100.

Figure 10A:
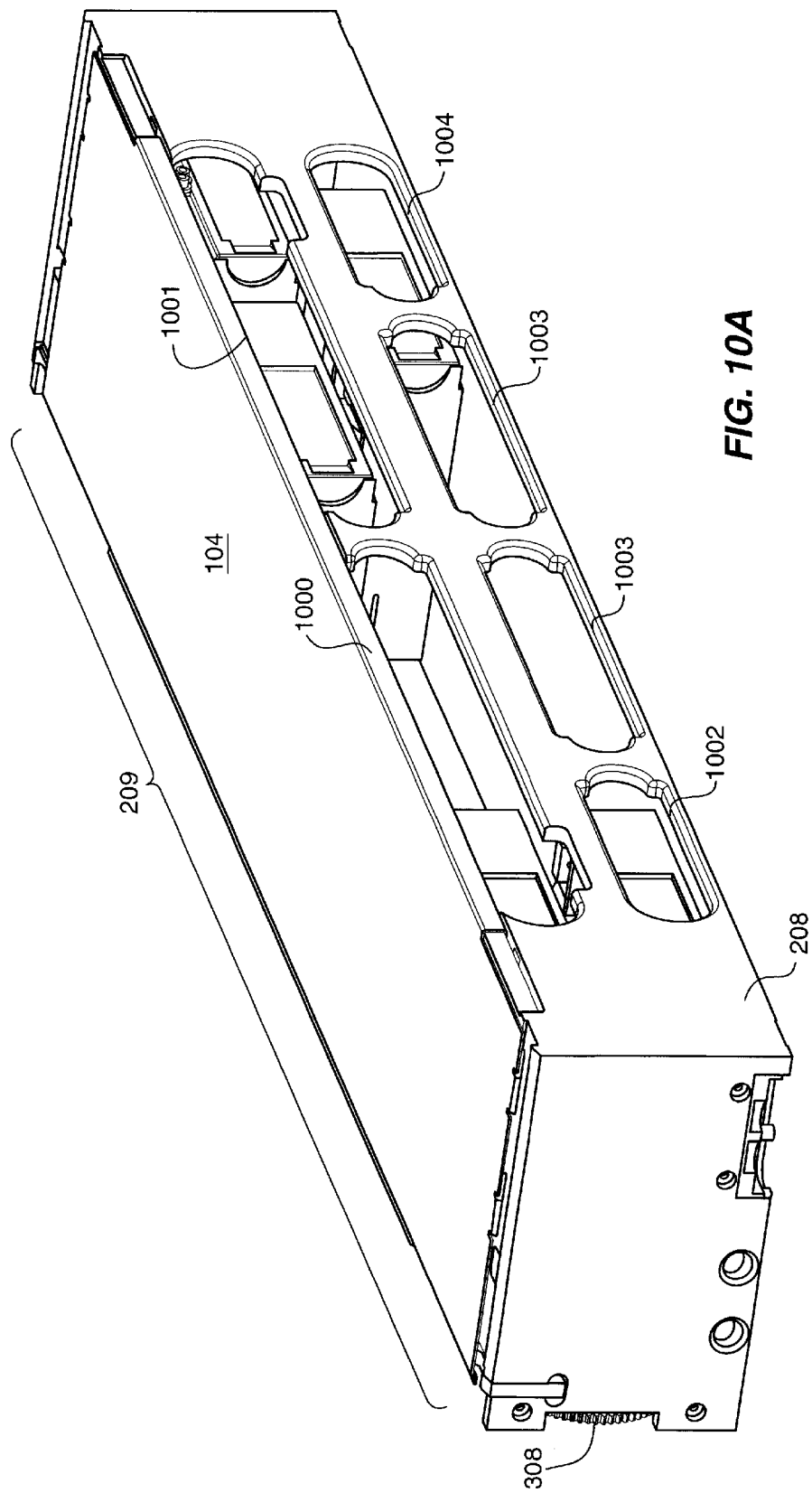
FIG. 10a illustrates additional details of the tape cartridge transport magazine.

The face of the tape cartridge transport magazine 104 includes a cover plate 208 in which is formed apertures that correspond to storage locations 200–207. The cover plate 208 may include more or less apertures as a matter of design choice so long as a single aperture is located opposite the cartridge picker 102, since this is the cartridge retrieval location. For example, the cover plate 208 could include an aperture configuration as shown in FIG. 10a, depicting apertures 1000–1004. A slidable cover to reduce the possibility of the introduction of environmental contaminants into the tape cartridge transport magazine 104 may also be used to seal the aperture(s).

The tape cartridge transport magazine 104 slidably interfaces with a magazine port 108 in the housing 110. The tape cartridge transport magazine 103 slidably interfaces with a magazine port 109 in the housing 110. Additionally, the tape cartridge transport magazines, 103 and 104, are interchangeable so that the tape cartridge transport magazine 104 slidably interfaces with the magazine port 109 and the tape cartridge transport magazine 103 slidably interfaces with the magazine port 108. It should be noted, however, that to maintain proper orientation of the tape cartridges in a magazine, e.g. 104, with respect to the picker 102, it is necessary to flip the magazine 104 so that the opposing end of the magazine 104 is inserted into the magazine port 109. This is accomplished by disconnecting a removable plastic handle 900 (shown in FIG. 9) from one end 319 of the magazine 104 and reconnecting the handle 900 to the opposing end 320 of the magazine 104. The handle 900 attaches to either end 319 or end 320 of the magazine 104, and permits the magazine 104 to be flipped for insertion into the opposite magazine port, in this case port 109.

Figure 3A:
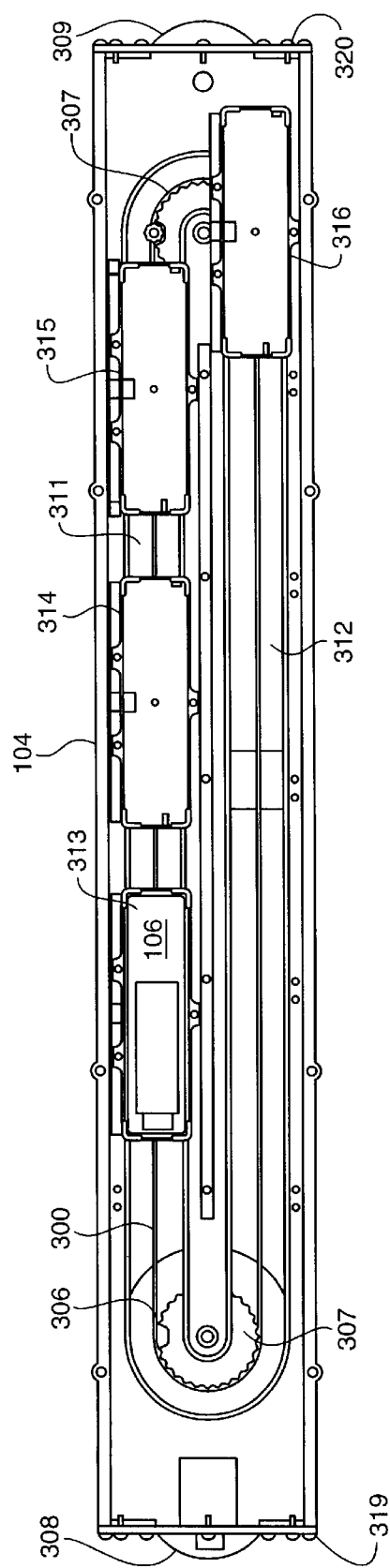
FIG. 3a illustrates a cross sectional view of the tape cartridge transport magazine.
Figure 3B:
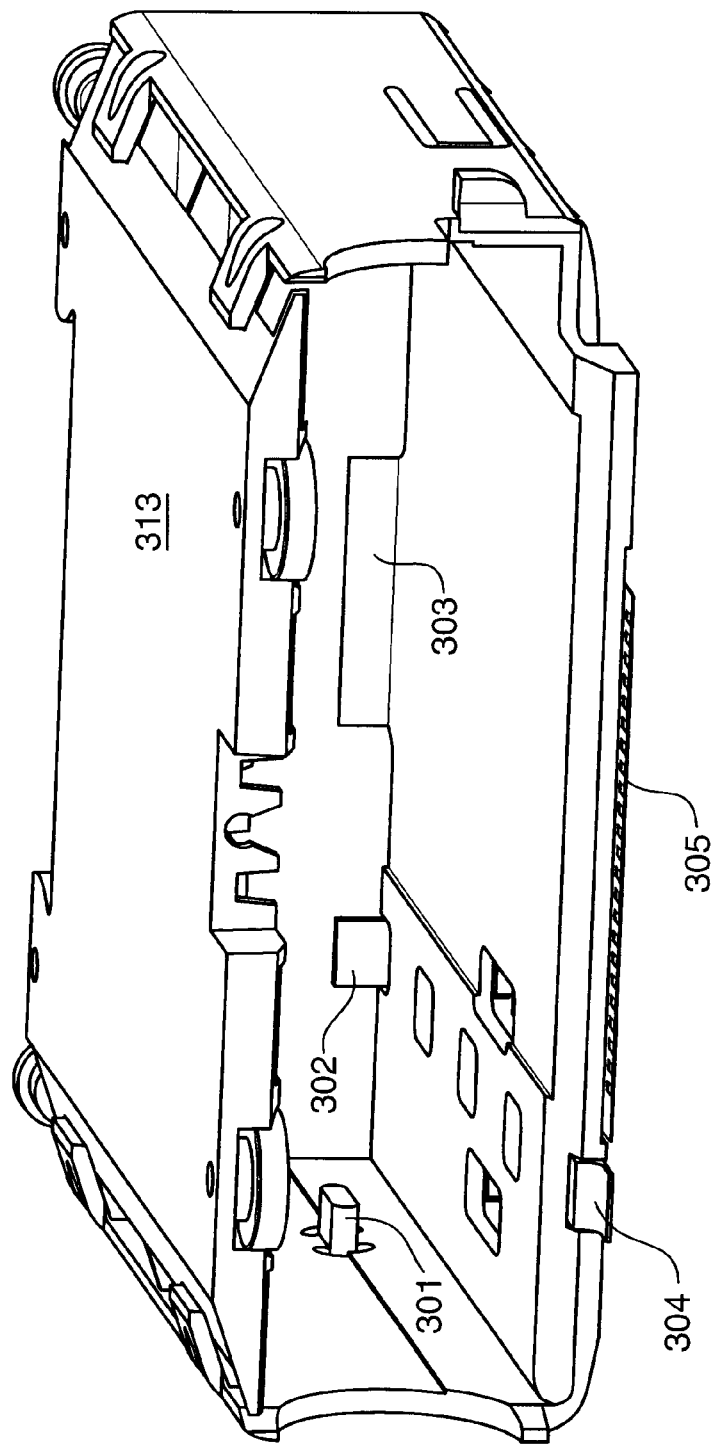
FIG. 3b illustrates a front perspective view of a carriage for the tape cartridge transport magazine.
Figure 3C:
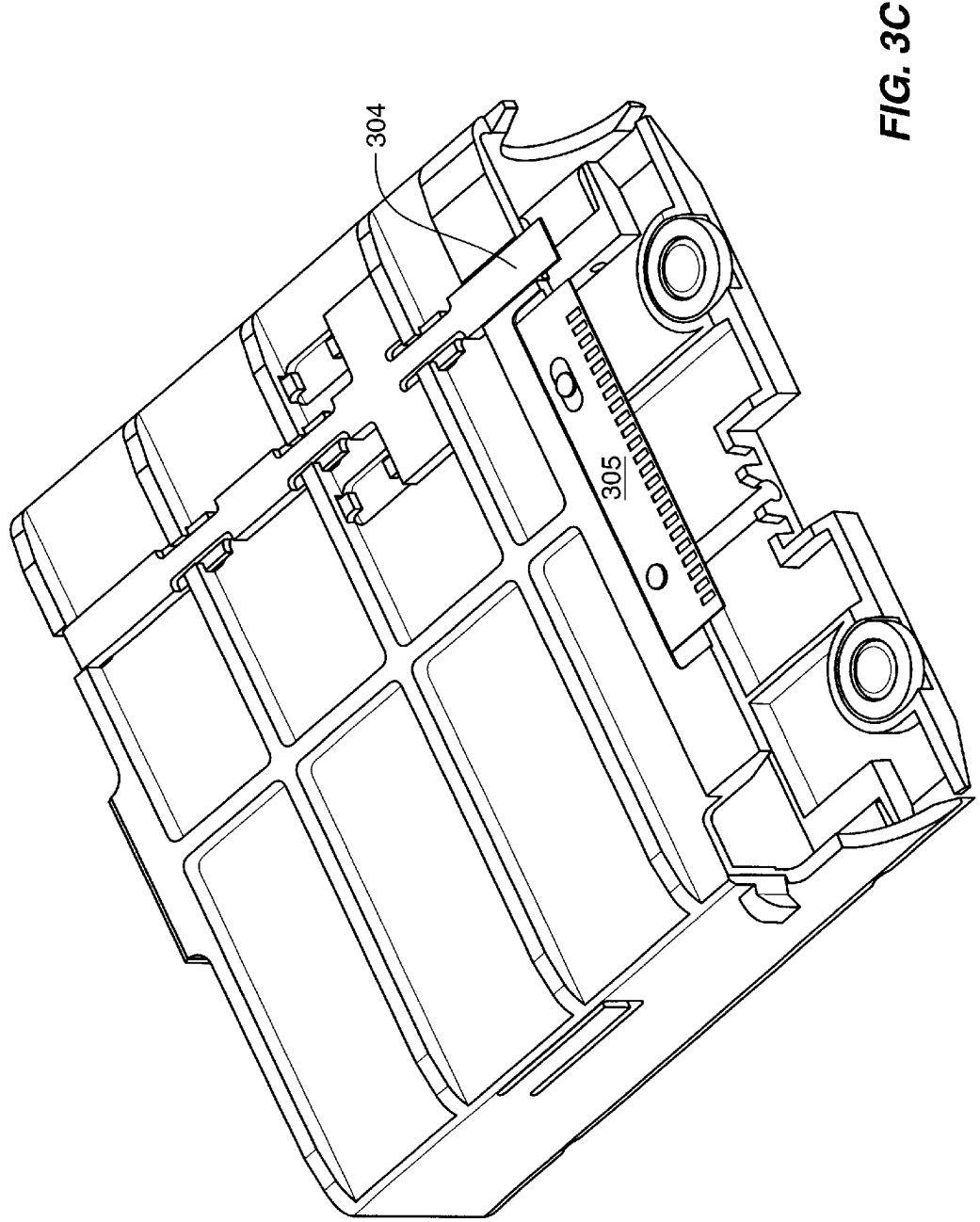
FIG. 3c illustrates a bottom perspective view of the carriage for the tape cartridge transport magazine.

Transport Mechanism:

Referring first to FIGS. 3a, 3b, and 3c, the plurality of tape cartridges are loaded into the tape cartridge transport magazine 104 by sliding the individual tape cartridges into individual carriages 313–316. The carriages 313–316 are oriented in a horizontal relationship relative to the magazine 104. Those skilled in the art will appreciate that only carriages 313–316 are shown on FIG. 3a and additional carriages are omitted for clarity. Furthermore, carriages 314–316 are shown empty, while carriage 313 is shown with the tape cartridge 106. The following description is primarily related to carriage 313 but applies equally to all carriages in the magazine 104.

Referring to FIGS. 3b and 3c, the carriage 313 is a four-sided rectangular housing with an open back and an open front. The open front permits insertion of the tape cartridge 106. A key 301 that mates with a corresponding feature on the tape cartridge 106 prevents the tape cartridge 106 from being inserted into the carriage 313 in other than the proper orientation. A cartridge present switch 302 in the back of the carriage 313 indicates to the autoloader/library system 100 when the cartridge 106 is present in carriage 313. The cartridge present switch 302 is triggered by the insertion of the cartridge 106 into the carriage 313. When the cartridge 106 is inserted, the cartridge present switch 302 is pushed back toward the rear of the carriage 313 until the cartridge 106 comes to rest against a stop 303 in the back of the carriage 313. As the cartridge present switch 302 is pushed toward the rear of the carriage 313, a flag 304 is retracted into the underside of the carriage 313 by the cartridge present switch 302. A conventional sensor in the autoloader/library system 100 senses the presence or absence of the flag 304, during an inventory operation, to determine if the cartridge 106 is present in the carriage 313. Because of its position, the sensor cannot detect the flag 304 in the retracted position. Thus, if the sensor detects the flag 304 (i.e. the flag is not retracted) a carriage empty condition is indicated. If the sensor does not detect the flag 304, a cartridge present condition is indicated.

The tape cartridge transport magazine 104 transports the carriages 313–316 including the individual cartridges, e.g. 106, in a closed vertical loop between a top portion 311 and a bottom portion 312 of the magazine 104. A motor driven transport system moves carriages 313–316 to the different storage locations 200–207. The transport system comprises a belt 300 connected to each of the carriages 313–316. A gear assembly operates to rotate the belt 300 and transport the carriages 313–316 around the vertical loop. The carriages 313–316 are positioned at the storage locations 200–207 using a pair of sensors located in the autoloader/library system 100 and a perforated tab, as exemplified by tab 305 on carriage 313. Operationally, a first sensor detects the presence of the carriage 313 as the tab 305 passes over the first sensor and a second sensor uses the perforations to precisely position the carriage 313 at the storage location.

Figure 4:
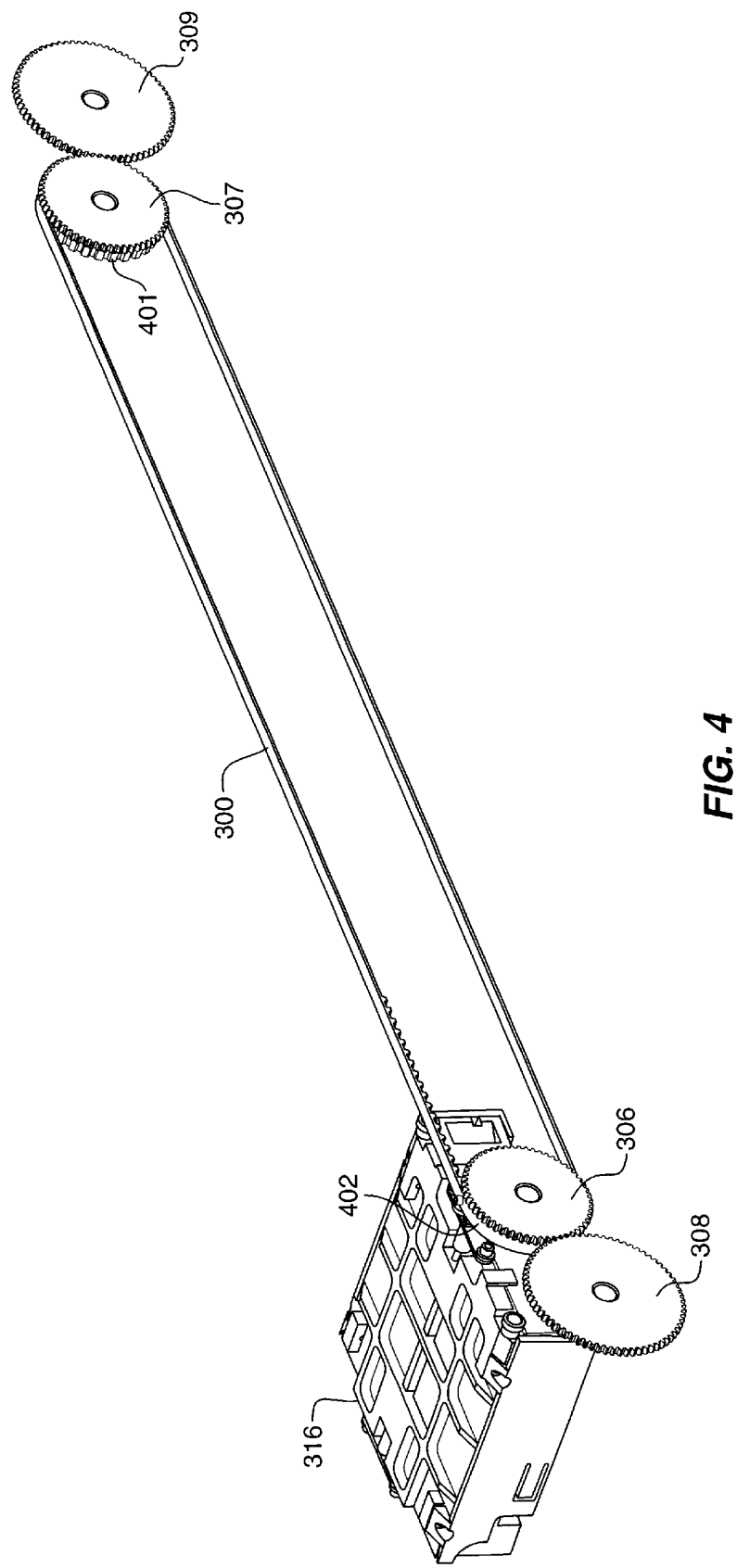
FIG. 4 illustrates a perspective view of a transport mechanism for the tape cartridge transport magazine.

Referring to FIG. 4, the gear assembly includes a gear set 306 and 307 coupled to the belt 300. The belt 300 rides on a pulley 402 coupled to the gear 306 and a respective pulley 401 coupled to the gear 307. Since the tape cartridge transport magazines, 103 and 104, are designed to be interchangeable, a drive gear 308 and drive gear 309 is included at each end, 319 and 320, of the magazine 104. This permits operation of the transport mechanism when the magazine 104 is used in the magazine port 108 and when the magazine 104 is used in the magazine port 109.

Figure 5A:
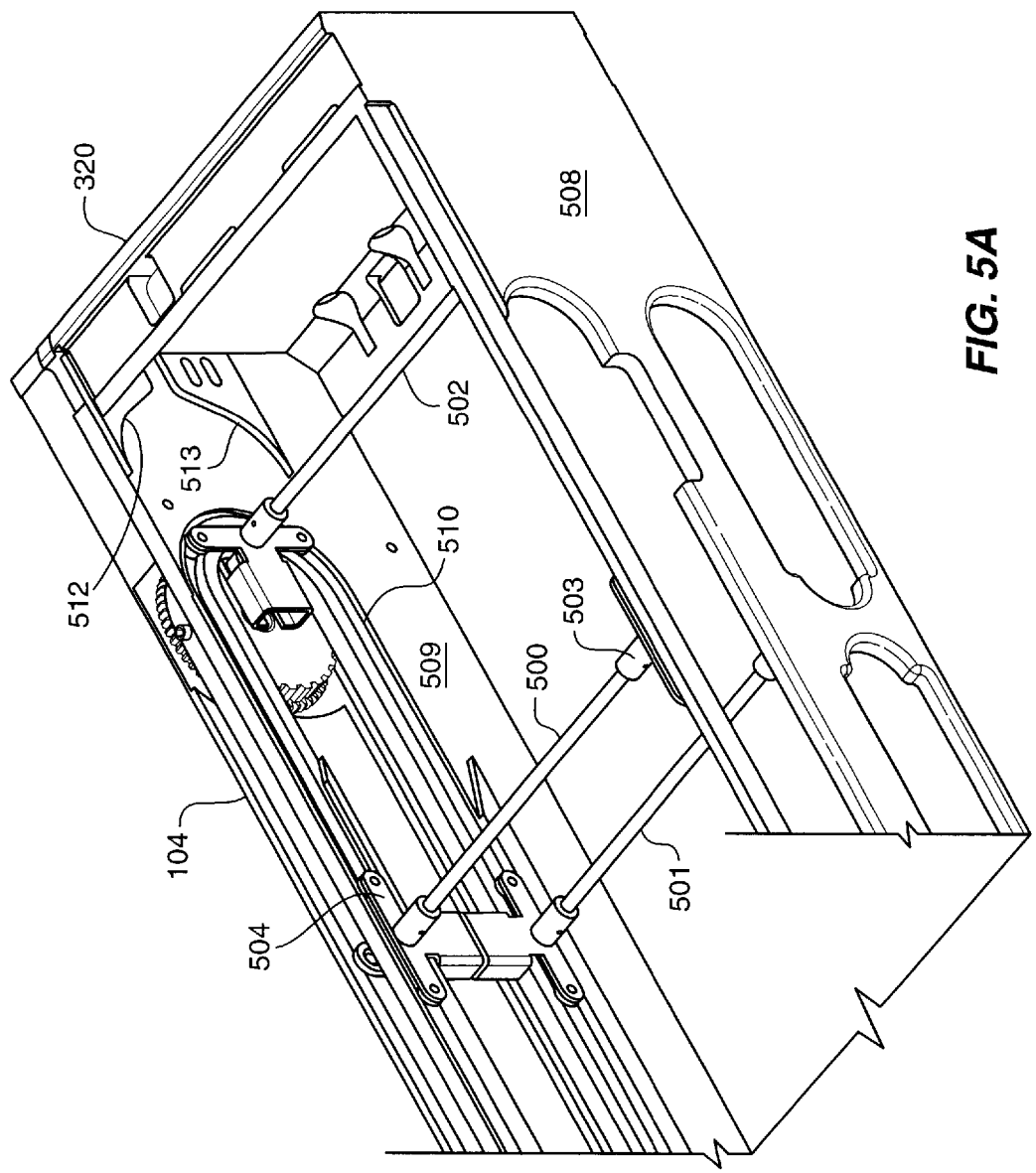
FIG. 5a illustrates additional details of the transport mechanism for the tape cartridge transport magazine.
Figure 5B:
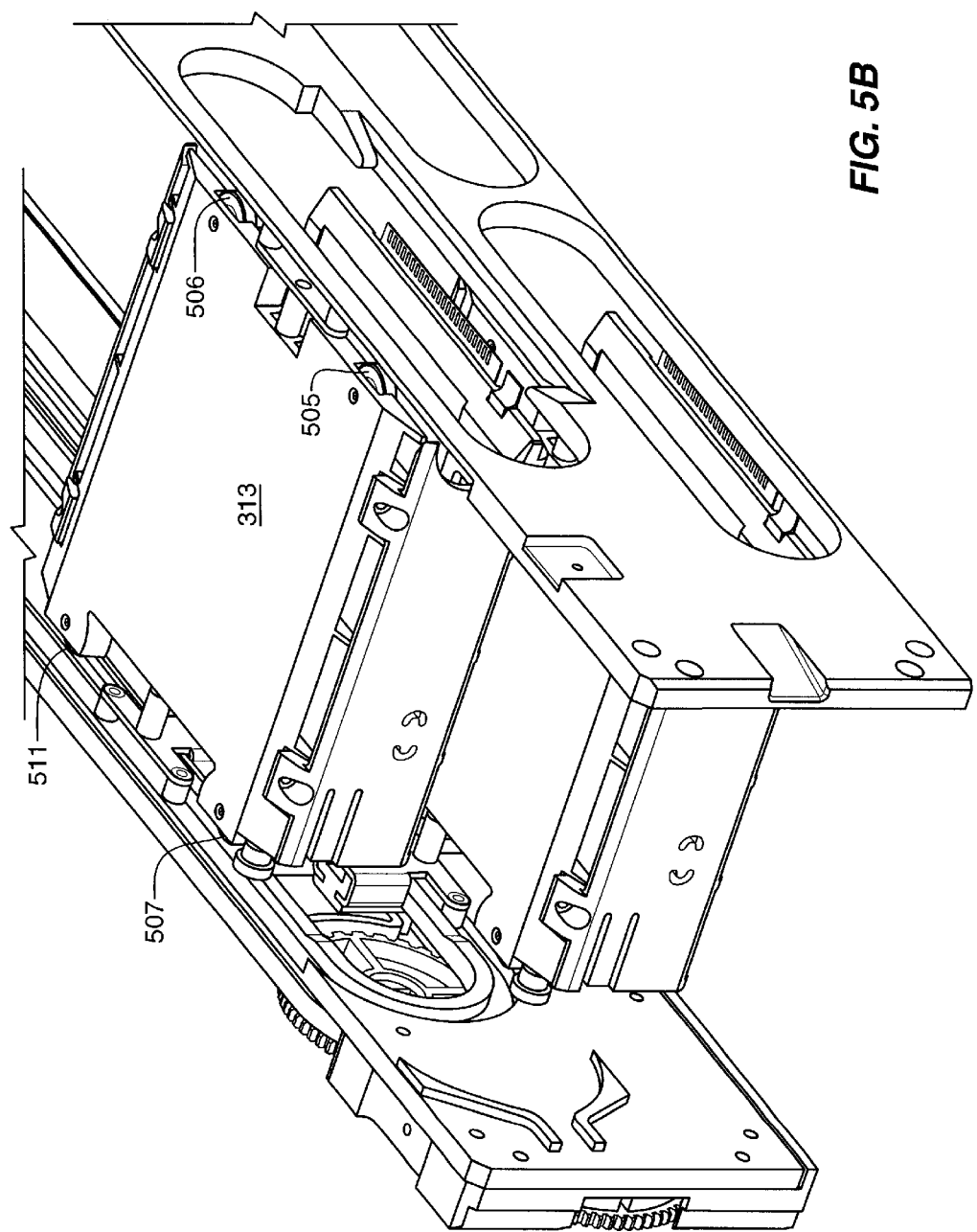
FIG. 5b illustrates additional details of the transport mechanism for the tape cartridge transport magazine.
Figure 6:
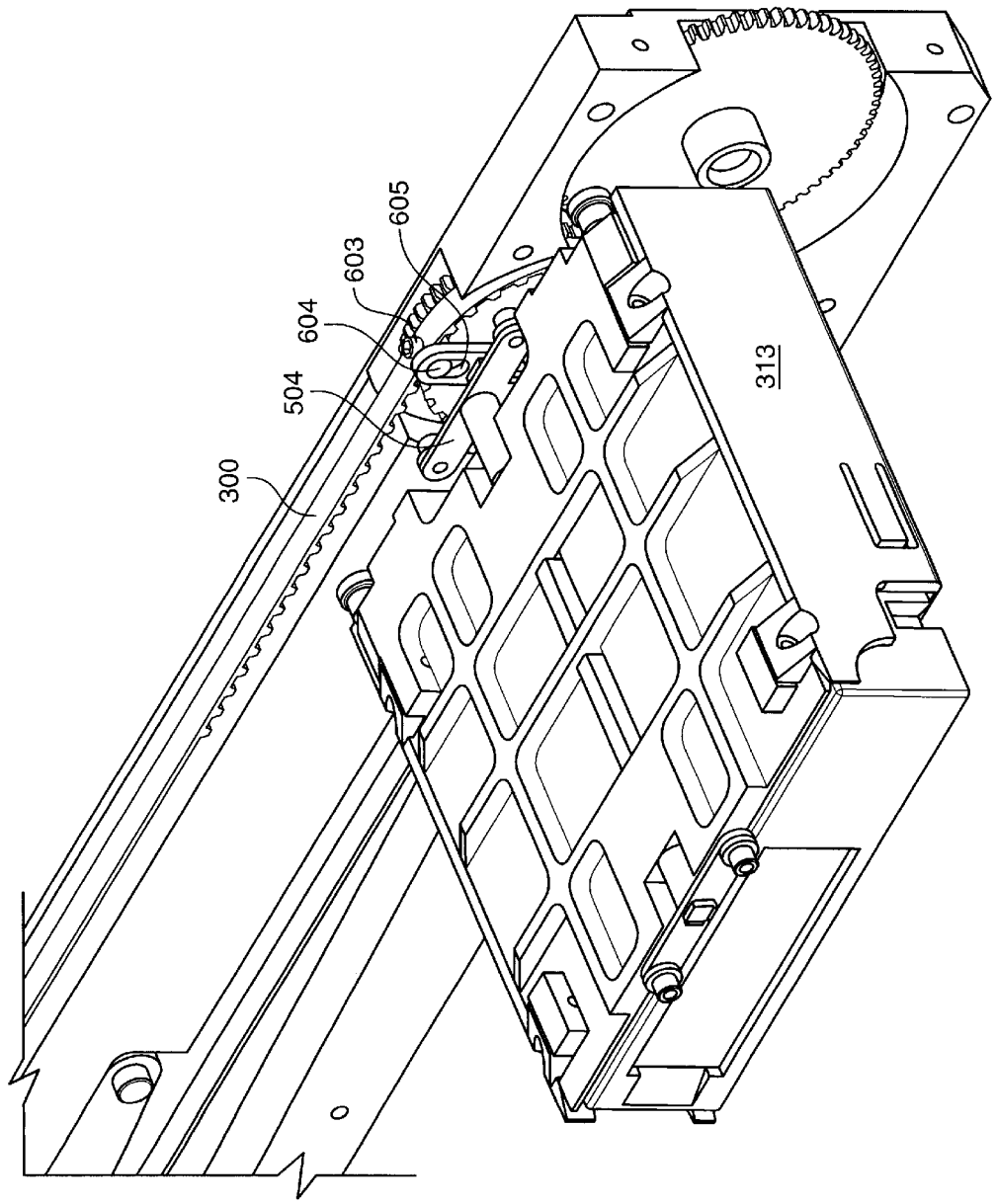
FIG. 6 illustrates additional details of the transport mechanism for the tape cartridge transport magazine.

Referring to FIGS. 5a, 5b, and FIG. 6, the carriages 313–316 are rotatably connected to mounting assemblies, e.g. 500–502. The mounting assemblies 500–502 travel in a pair of opposing tracks formed in the walls, 508 and 509, of the magazine 104, as exemplified by track 510 in wall 509. The mounting assemblies, e.g. assembly 500, each comprise a pair of wheeled apparatus, 503 and 504, interconnected by a mounting bar 512. The wheeled apparatus 504 is connected to the belt 300 by a fastener 603 connected to a bearing 604. The bearing 604 snaps into an aperture 605 defined in the wheeled apparatus 504 and rotates slightly in the aperture 605 as the carriage 313 rounds the corner from the top portion 311 to the bottom portion 312 of the magazine 104. The carriages 313–316 each include a first set of wheels as exemplified by wheels 505, 506, 507, and 511 on carriage 313 that operate to eliminate translation play in the carriages 313–316 as they travel in the vertical closed loop within the magazine 104. As will become apparent from the following description, the carriages 313–316 also include a second set of wheels that facilitate transfer of the carriage around the corner from the top portion 311 to the bottom portions 312 of the magazine 104.

The belt 300 and carriages 313–316 are moved in the vertical closed loop by a motor. In this illustrated example, the magazine 104 is a passive mechanism, in that it is not powered internally, but rather, the motor 208 (shown in FIG. 2) is located in the rear of the magazine port 108 and mates with the drive gear 309 when the magazine 104 is inserted into the port 108. Another motor, (not shown) is included in the magazine port 109 and mates with the drive gear 308 when the magazine 104 is inserted into port 108. Optionally, the motors, e.g. 208, could be located within tape cartridge transport magazines, 103 and 104, and interconnect with electrical contacts located in the magazine ports, 108 and 109, when the tape cartridge transport magazines, 103 and 104, are inserted therein.

Figure 10B:
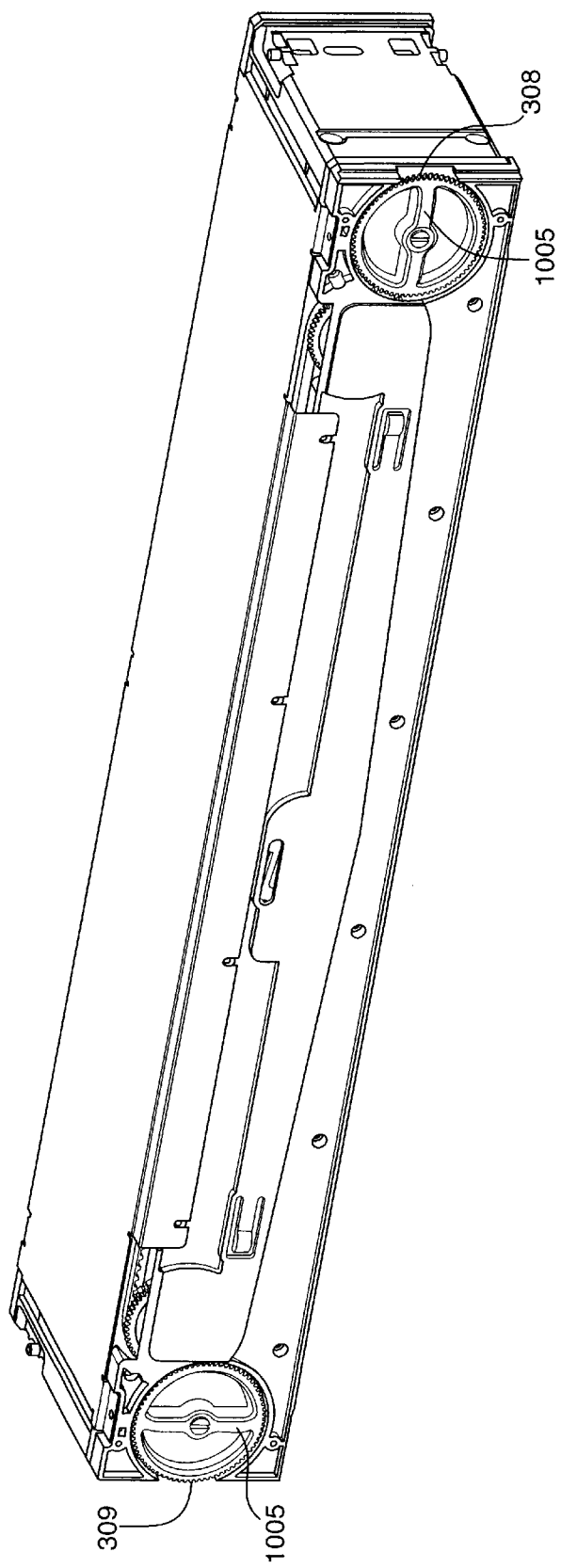
FIG. 10b illustrates additional details of the tape cartridge transport magazine.

Referring to FIGS. 10*a* and 10*b*, the drive gears 308 and 309 include handles 1005 and 1006 respectively. The handles 1005 and 1006 permit an operator to rotate the cartridges and carriages through the magazine 104 when the magazine 104 is removed from the autoloader/library system 100. This permits inventorying cartridges and loading and unloading cartridges from the magazine 104. It should also be noted that a portion of the drive gears, 308 or 309, is also exposed in the assembled magazine 104 to permit the drive gears 308 and 309 to couple with the motors, e.g. 208, in the magazine port 108. When the motor 208 is powered, the carriages 313–316 travel along the top portion 311 of the magazine 104 until they are passed to the bottom portion 312 of the magazine 104. The motor 208 operates in both a forward and reverse direction. Advantageously, this permits the most efficient positioning of tape cartridges for selection and retrieval by the cartridge picker 102. For example, if the desired tape cartridge is currently in the carriage 313 at the storage location 205, the transport mechanism operates in a counterclockwise direction to move the carriage 313 to the storage location 204 for retrieval by the cartridge picker 102. Similarly, if the desired tape cartridge is currently in the carriage 313 at the storage location 203, the transport mechanism operates in a clockwise direction to move the carriage 313 to the storage location 204 for retrieval by the cartridge picker 102.

Figure 7:
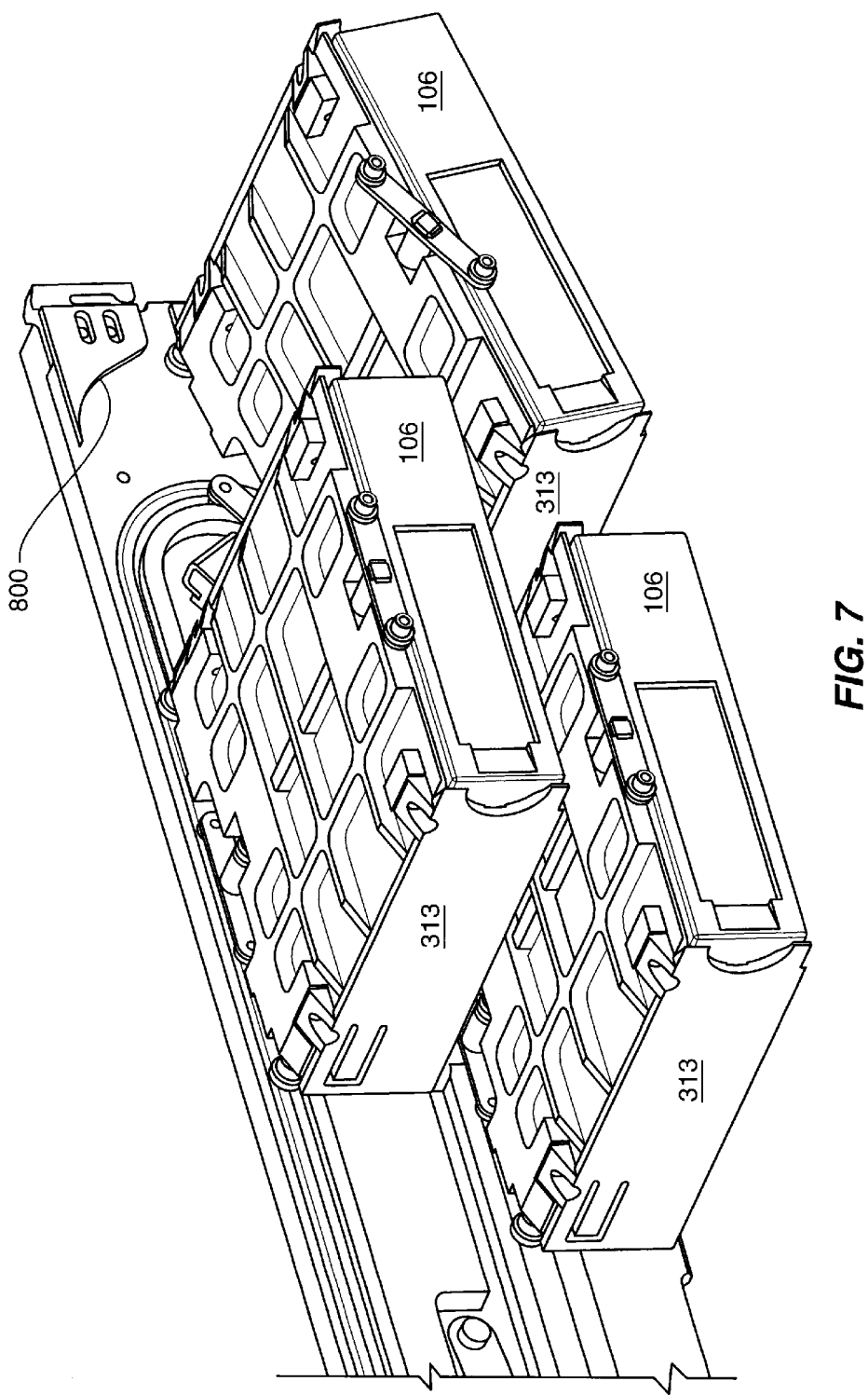
FIG. 7 illustrates an example of the carriage positions during operation of the tape cartridge transport magazine.

As the belt 300 travels around the pulleys, 401 and 402, the wheeled apparatus 504 remains connected to the belt 300. As the carriage 313 rounds the corner from the top portion 311 to the bottom portion 312 of the magazine, the wheeled apparatus, e.g. 503 and 504, rotate around the bar 512 in the tracks, e.g. track 510. Advantageously, the carriages 313–316 are not flipped or re-oriented as they travel within the magazine 104. This permits proper positioning of the contained tape cartridges for retrieval by the picker 102. FIG. 7 illustrates the various positions of the carriage 313 as the carriage 313 travels from the top portion 311 to the bottom portion 312 of the magazine 104.

Figure 8:
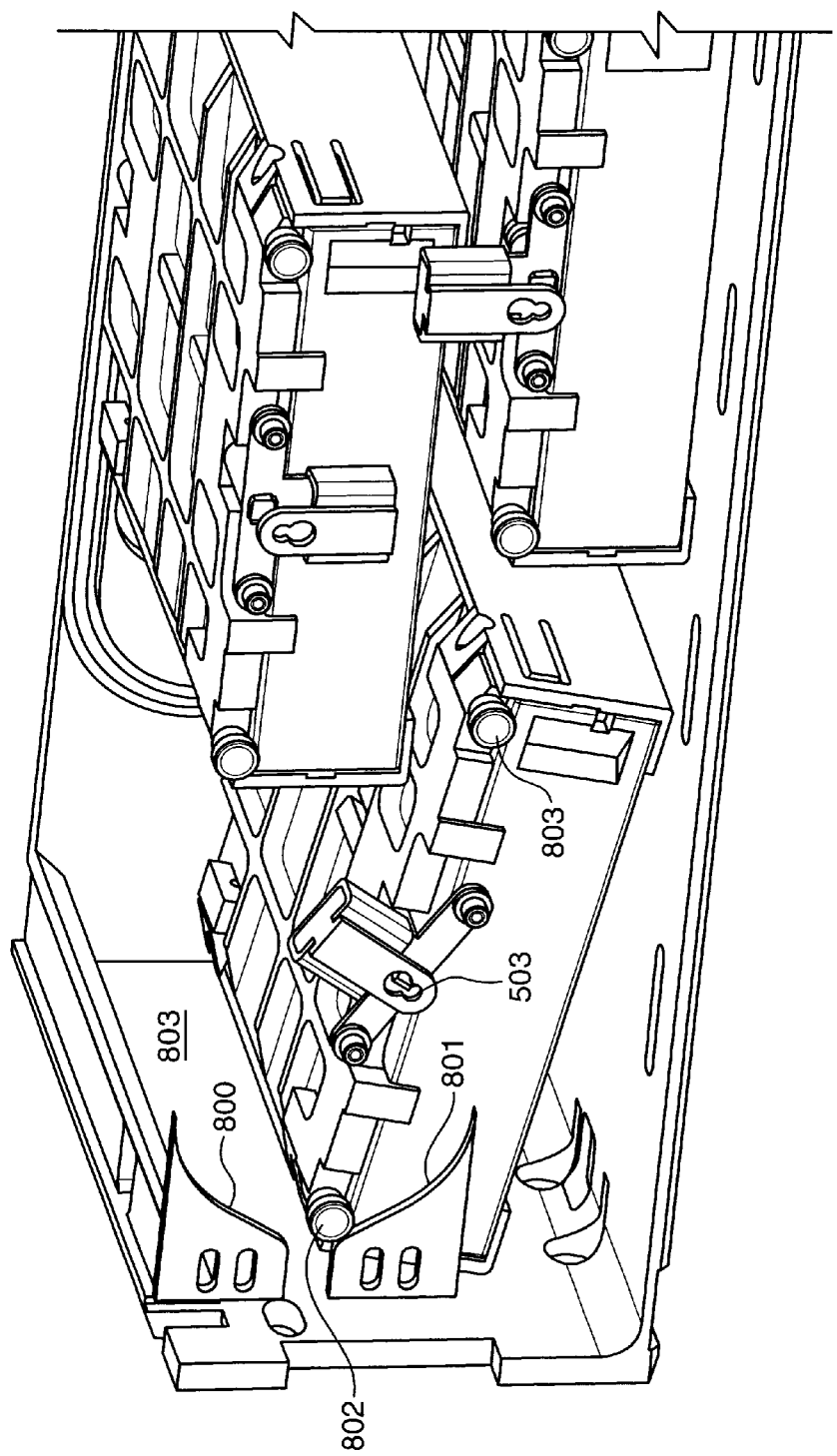
FIG. 8 illustrates another example of the carriage positions during operation of the tape cartridge transport magazine.
Figure 9:
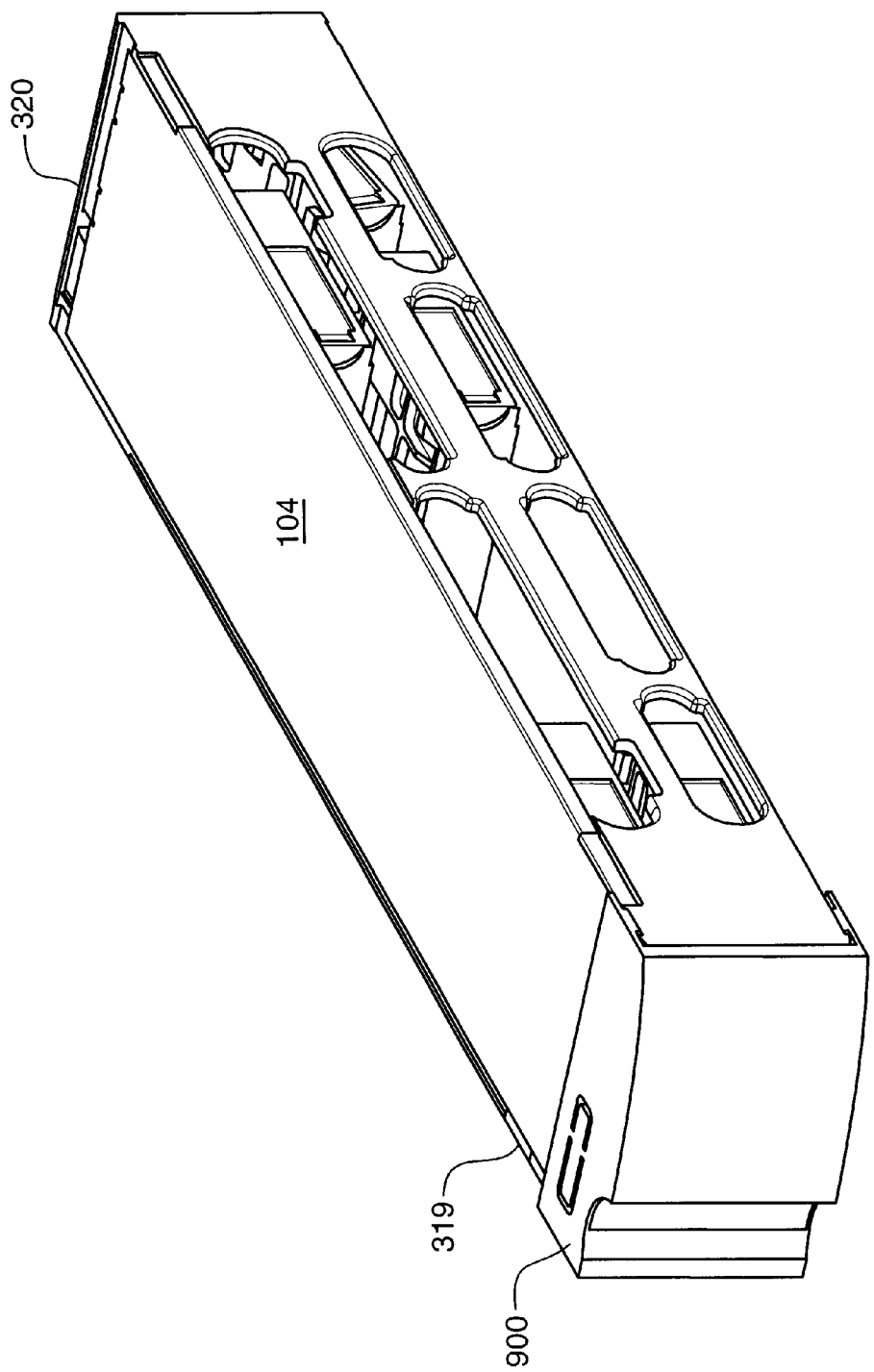
FIG. 9 illustrates additional details of the tape cartridge transport magazine.

The carriages 313–316 also include a second pair of wheels, as exemplified by wheels 802 and 803 shown in FIG. 8. The wheels, 802 and 803, travel in guide tracks, 800 and 801 and facilitate the transfer of the carriage from the top portion 311 to the bottom portion 312 of the magazine 104. The guide tracks, 800 and 801, are connected to the back wall 803 of the magazine 104, and in combination with the wheels, 802 and 803, guide and support the carriage 313 as the carriage 313 travels from the top portion 311 to the bottom portion 312. The additional support provided by the tracks, 800 and 801, prevent binding as the carriage 313 and the wheeled apparatus, e.g. 503 and 504, round the corner from the top portion 311 to the bottom portion 312. The tracks, 800 and 801, also orient the carriages 313–316 as they enter the corners so that as an individual carriage, e.g. 313, rounds the corner it is clear of the other carriages 314–316. Similarly, when the transport mechanism is operated in the opposite direction, the tracks, 800 and 801, support the end of the carriage 313 to prevent binding as the carriage 313 rounds the corner from the bottom portion 312 to the top portion 311 of the magazine 104. An identical pair of guide tracks, e.g. 800 and 801, are included in the opposing end of the magazine 104 to guide and support the carriages as they round the opposing corner from the bottom portion 312 to the top portion 311 or top portion 311 to bottom portion 312. Advantageously, the transportation of the carriages 313–316 within the magazines 104 permits positioning of any one of the individual carriages 313–316 and corresponding tape cartridge at any one of the storage locations 200–207.

Figure 11:
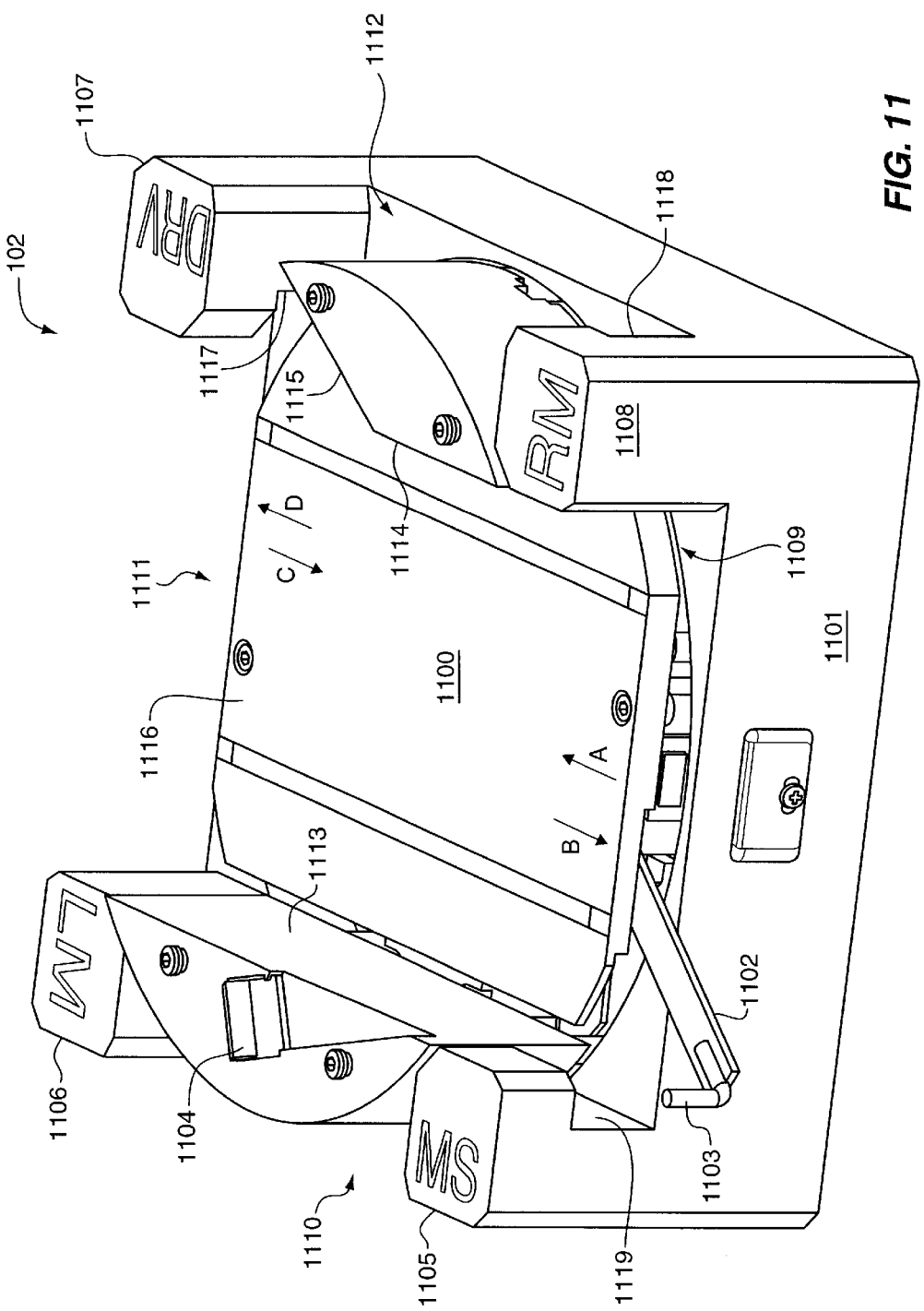
FIG. 11 illustrates an example of a tape cartridge picker for the tape cartridge autoloader/library system according to the present invention.
Figure 12A:
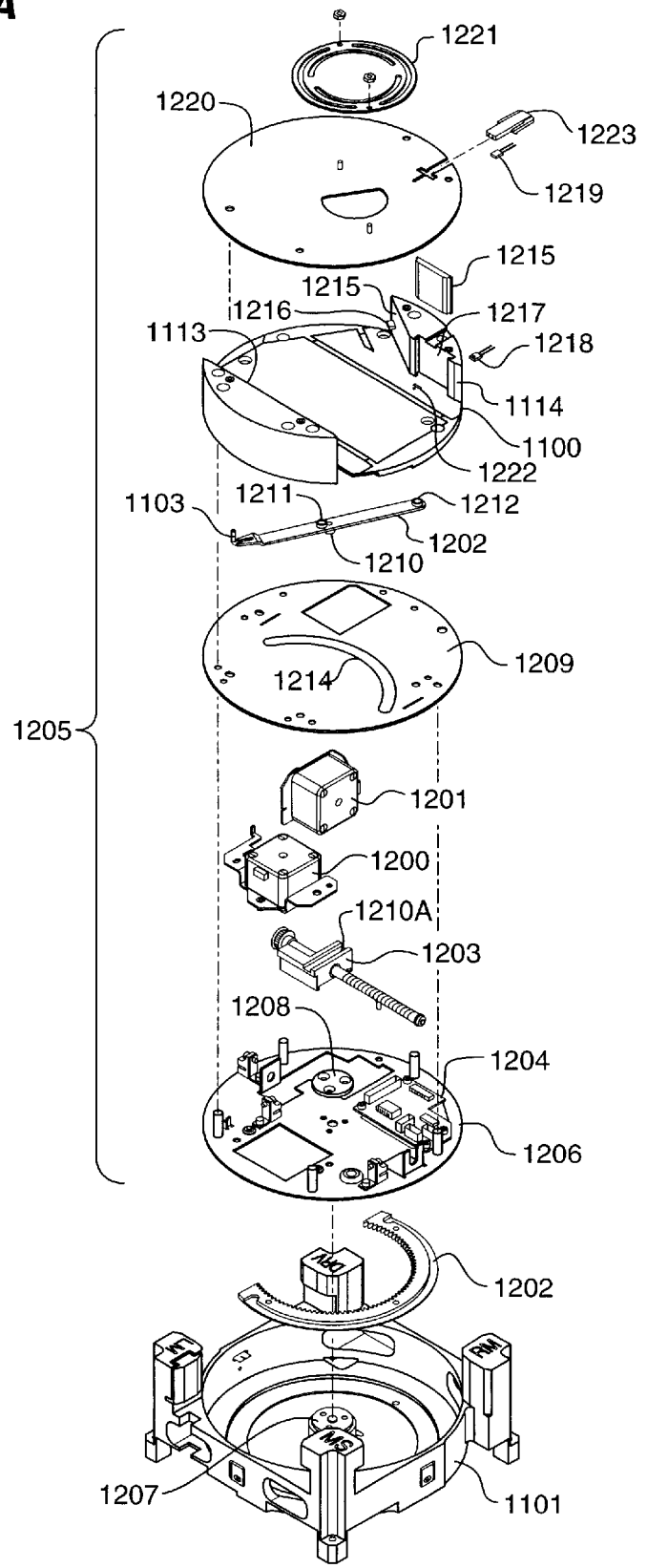
FIG. 12a illustrates an assembly view of the tape cartridge picker.
Figure 12B:
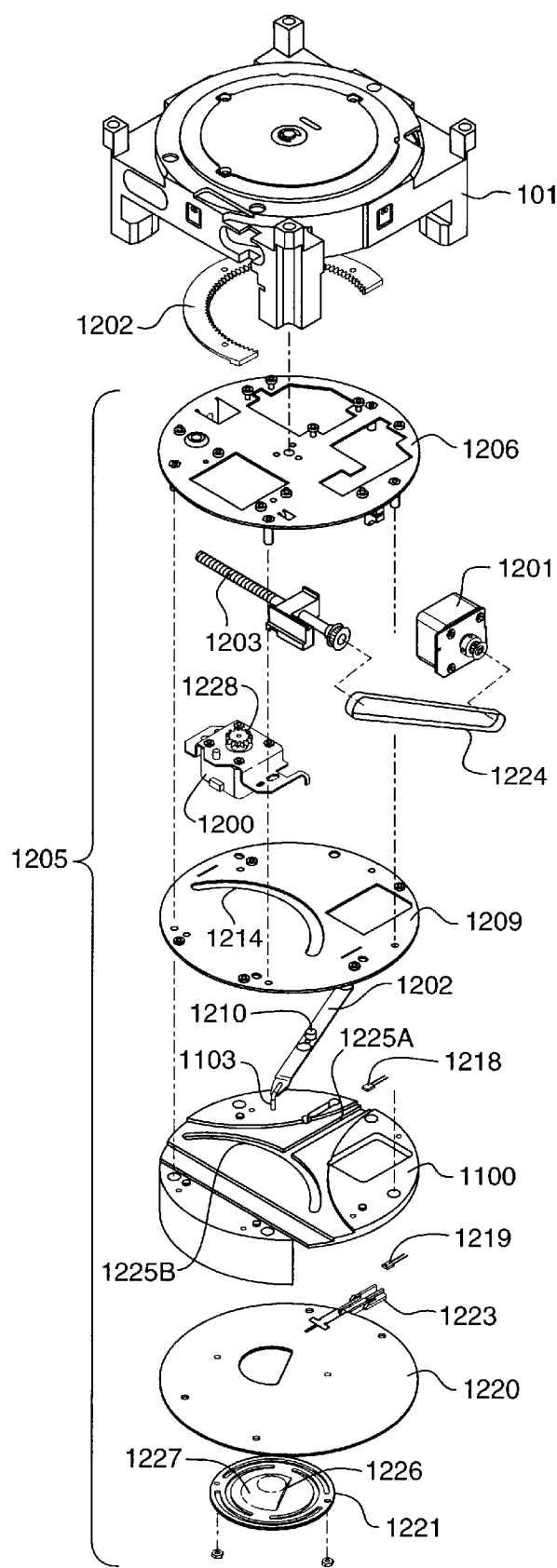
FIG. 12b illustrates another assembly view of the tape cartridge picker.
Figure 13:
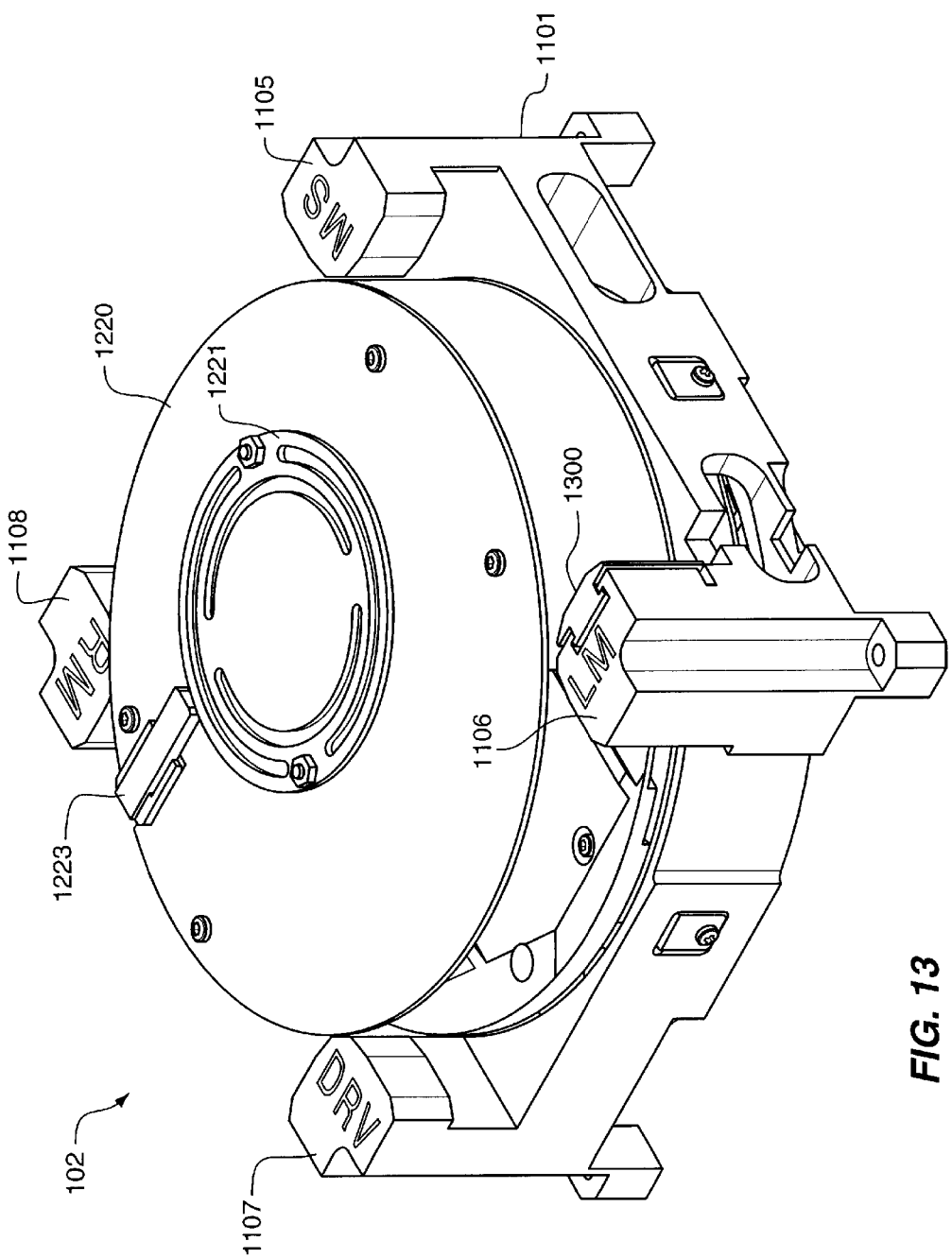
FIG. 13 illustrates an assembled view of the tape cartridge picker.

The Cartridge Picker FIGS. 11–13:

For purposes of illustration, the tape cartridge 106 is used throughout the following description of the cartridge picker 102. It should be understood, however, that the cartridge picker 102 could be easily designed according to the principles of the present invention to accommodate numerous tape cartridge formats other than the DLT format of the cartridge 106.

Referring first to FIG. 11, the cartridge picker 102 comprises a translation arm 1102 and a turntable 1100 rotatably connected to a stationary base 1101. The turntable 1100 includes a central cavity 1116 configured to receive the tape cartridge 106 on the turntable 1100. Parallel walls, 1113 and 1114, and a wall 1115 integrally formed at a thirty-degree angle to wall 1114, define the central cavity 1116. Alternatively, the wall 1115 could be formed at other angles depending on the geometry of the cartridge. As will become apparent from the following description, the angle of the wall 1115 permits the translation arm 1102 to pass behind the tape cartridge 106 during unloading from the single cartridge interface 107. The translation arm 1102 comprises a perpendicular cartridge pin 1103 integrally formed in one end. The cartridge pin 1103 is configured to engage or seat in a notch 111 (shown on FIG. 1*a*) formed in the tape cartridge 106.

The cartridge picker 102 also comprises a bar code reader 1104 for reading computer readable indicia on the tape cartridges. The bar code reader 1104 could be configured in any suitable manner that permits the bar code reader 1104 to read the indicia on the tape cartridges. In one example of the present invention, the bar code reader 1104 includes a mirror that reflects an image of the indicia on the tape cartridge to the bar code reader 1104. Advantageously, since the turntable 1100 rotates, the bar code reader 1104 could be located at numerous other locations on the cartridge picker 102 as a matter of design choice. Alternatively, in some applications, the bar code reader 1104 could be separate from the picker 102 and located in the autoloader/library system 100.

The picker base 1101 comprises four vertical columns 1105–1108 that define four cartridge exchange ports 1109–1112. As will become apparent from the following description, columns 1105, 1107, and 1108 are undercut in portions 1117–1119 so that the columns 1105, 1107, and 1108 do not interfere with the translation arm 1102 during retrieval and delivery of the tape cartridge 106. Operationally, the turntable 1100 rotates within the base 1101 to exchange tape cartridges with the single cartridge interface 107, the tape drive 101, and the tape cartridge transport magazines, 103 and 104, through the exchange ports 1109–1112. Specifically, the turntable 1100 exchanges the tape cartridge 106 with the magazine 103 through the exchange port 1109, exchanges the tape cartridge 106 with the single cartridge interface 107 through the exchange port 1110, exchanges the tape cartridge 106 with the magazine 104 through the exchange port 1111, and exchanges the tape cartridge 106 with the tape drive 101 through the exchange port 1112.

FIG. 12*a* illustrates a top down assembly view of the tape cartridge picker 102 and FIG. 12*b* illustrates a bottom up assembly view of the tape cartridge picker 102. FIG. 13 illustrates a perspective view of an assembled cartridge picker 102. Two motors control the operation of the cartridge picker 102. A rotation motor 1200 rotates a spur gear 1228 that couples to a ring gear 1202 mounted in the base 1101 to rotate the turntable assembly 1205. A translation motor 1201 and lead screw 1203, connected by a belt 1224, operate to extend and retract the translation arm 1102. The operation of the picker 102 is controlled by control circuitry 1204, mounted on a bottom plate assembly 1206. Flex cables (not shown) fed up from the bottom of the base 1101 provide power to the control circuitry 1204. Those skilled in the art will appreciate that the rotation motor 1200 could also be located within the autoloader/library system 100 or connected to the base 1101. In this case the rotation of the picker 102 could be accomplished using a belt and mating drive gear connected to the bottom plate assembly 1206.

The turntable assembly 1205 rotates around the ring gear 1202, which is internally coupled to the base 1101. Alternatively, the ring gear 1202 could be integrally formed in the base 1101. A coupling plate 1208 fastens the bottom plate assembly 1206 to a bearing member 1207 centrally located in the base 1101. The translation motor 1201 and the rotation motor 1200 mount to the bottom plate assembly 1206 and are housed between the bottom plate assembly 1206 and a middle plate 1209. The translation arm 1102 is slidably mounted between the middle plate 1209 and the turntable 1100. The translation arm 1102 includes a roller 1210 that passes through channel 1214 with clearance in the middle plate 1209 and is driven by channel 1210(a) in the lead screw 403. Rollers 1211 and 1212 ride in channels 1225(a) and 1225(b) respectively formed in the bottom of the turntable 1100.

A plate 1220 provides a top cover for the turntable assembly 1205. The plate 1220 also provides a mount for a cartridge stop/compression pad 1221. As will become apparent from the following description, the cartridge stop/compression pad 1221 stops the insertion of the tape cartridge 106 from the single cartridge interface 107 to position the cartridge 106 for engagement by the translation arm 1102 and the pin 1103. When the tape cartridge 106 is received from all other locations, i.e. the magazines, 103 and 104, and the tape drive 101, the cartridge stop/compression pad 1221 functions as a compression pad to permit the cartridge 106 to be fully received into the cavity 1116.

The wall 1114 of the turntable 1100 includes a flex wall 1215 configured to slide into notch 1217. The flex wall 1215 is spring loaded within the notch 1217 and functions to bias the tape cartridge 106 against the opposing wall 1113 when the tape cartridge 106 is received in the cavity 1116. Advantageously, this prevents the pin 1103 from disengaging from the cartridge notch 111 when the tape cartridge 106 is loaded and unloaded from the cavity 1116. The wall 1115 includes a key 1216 that mates with a corresponding groove on the side of the tape cartridge 106 to prevent mis-insertion of the tape cartridge 106 when the tape cartridge 106 is received from the single cartridge interface 107. Advantageously, this prevents an operator from forcing the tape cartridge 106 into the single cartridge interface 107 in the wrong orientation and damaging the cartridge picker 102.

The cartridge picker 102 also includes a cartridge present sensor comprising an emitter portion 1218 and a detector portion 1219. The emitter portion 1218 is mounted on the underside of the turntable 1100 and aligns with the aperture 1222 to provide a signal to the detector portion 1219. The detector portion 1219 is mounted in the housing 1223, which couples to the plate 1220. Operationally, a cartridge present condition is indicated when the tape cartridge 106, inserted into the cavity 1116, blocks the aperture 1222 so that the detector portion 1219 detects no single. Similarly, a cartridge not present condition is indicated by a continuous reception of signal by the detector portion 1219 from the emitter portion 1218. Alternatively, the detector portion 1219 and the emitter portion 1218 could easily be reversed.

Figure 29:
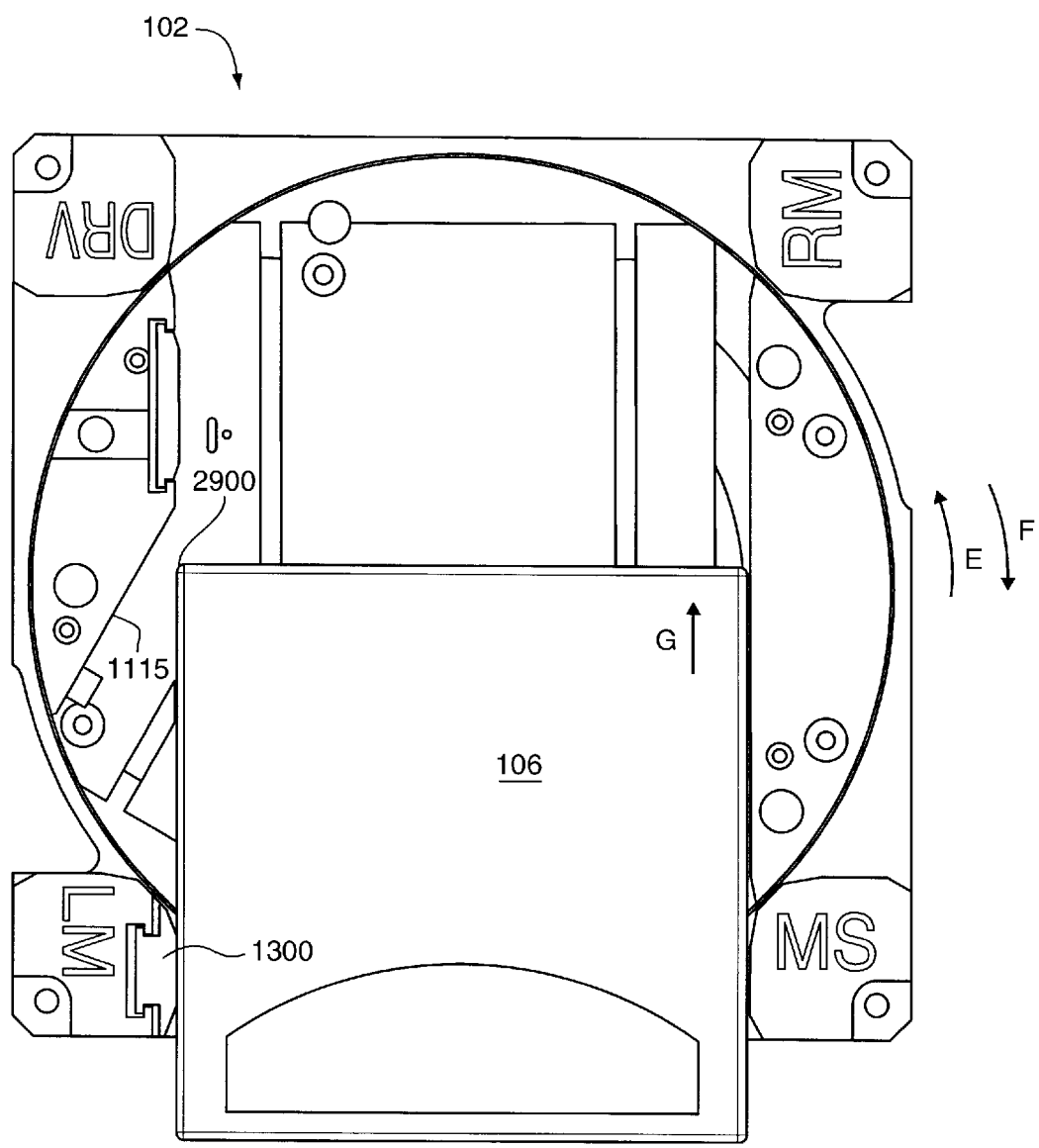
FIG. 29 is another perspective view of the tape cartridge picker during operation.

Referring also to FIG. 13, a second flex wall 1300 is included in the column 1106. The second flex wall 1300 is also spring loaded to guide the tape cartridge 106 during insertion from the single cartridge interface 107, and prevents the pin 1103 from disengaging from the cartridge notch 111. Referring to FIG. 29, the flex wall 1300 also prevents the cartridge 106 from rotating counter clockwise during transition into the cavity 1116, so that the corner 2900 of the tape cartridge 106 does collide with wall 1115 as the translation arm 1102 pulls the cartridge 106 in the direction (G).

Figure 14:
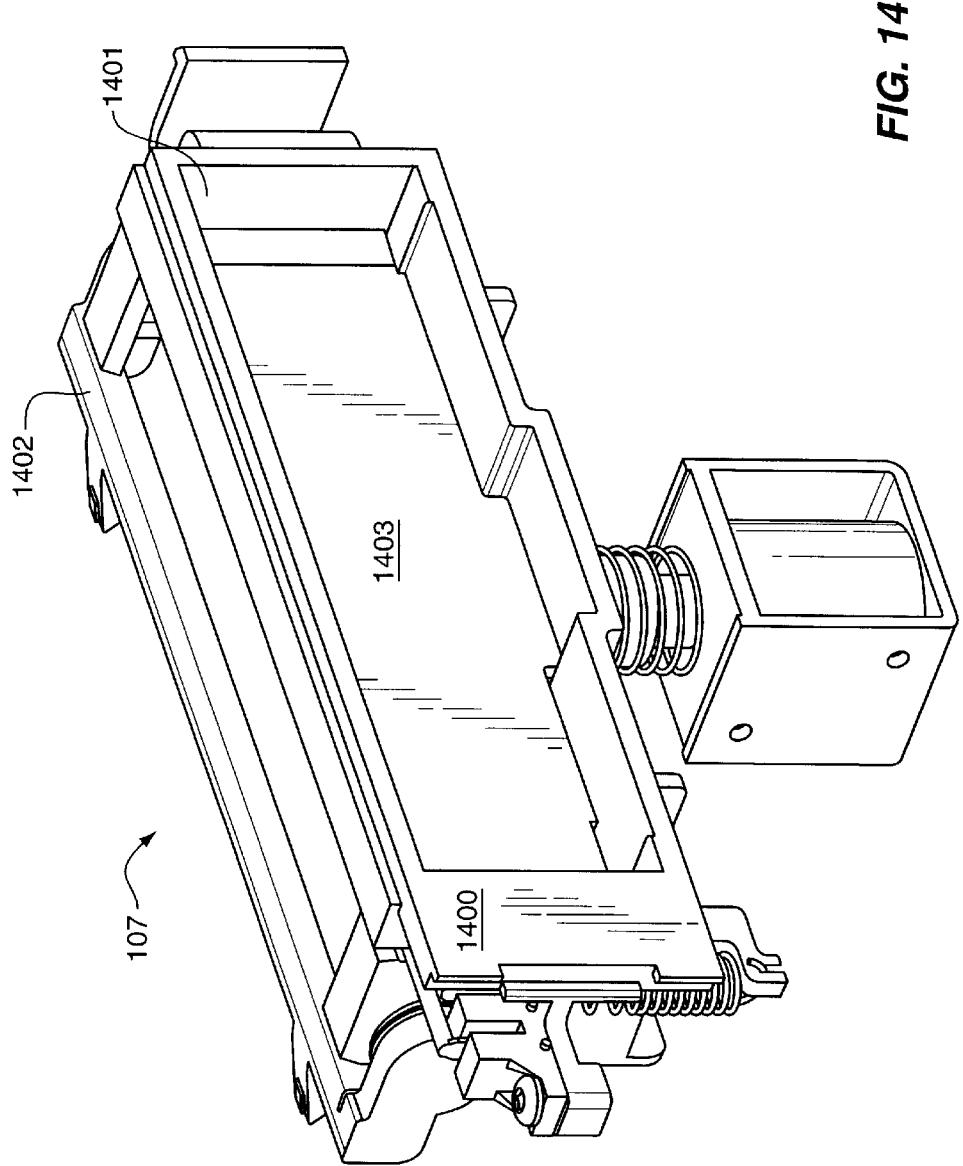
FIG. 14 illustrates an example of a single cartridge interface for the autoloader library system of the present invention.
Figure 15:
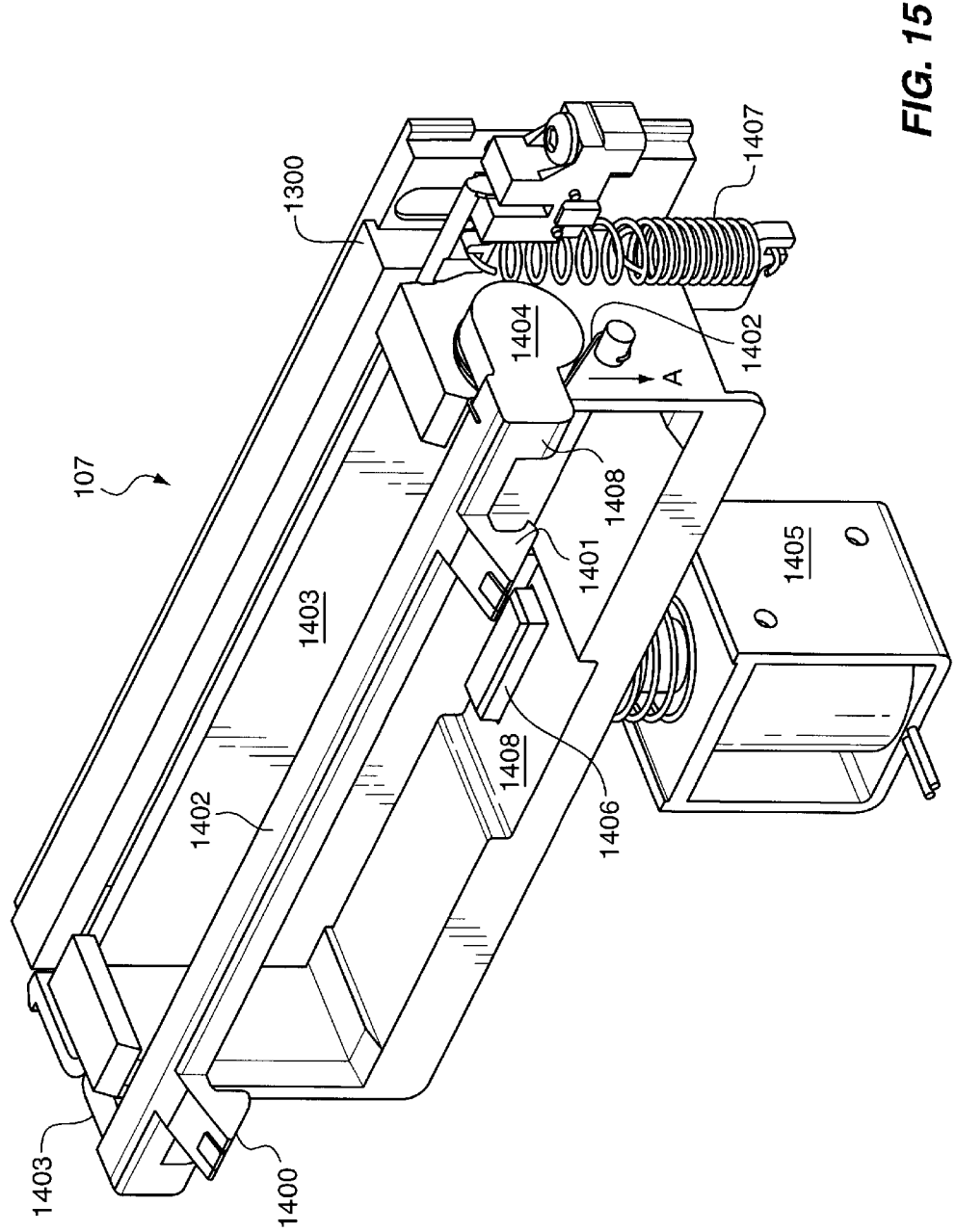
FIG. 15 illustrates additional details of the single cartridge interface.
Figure 32:
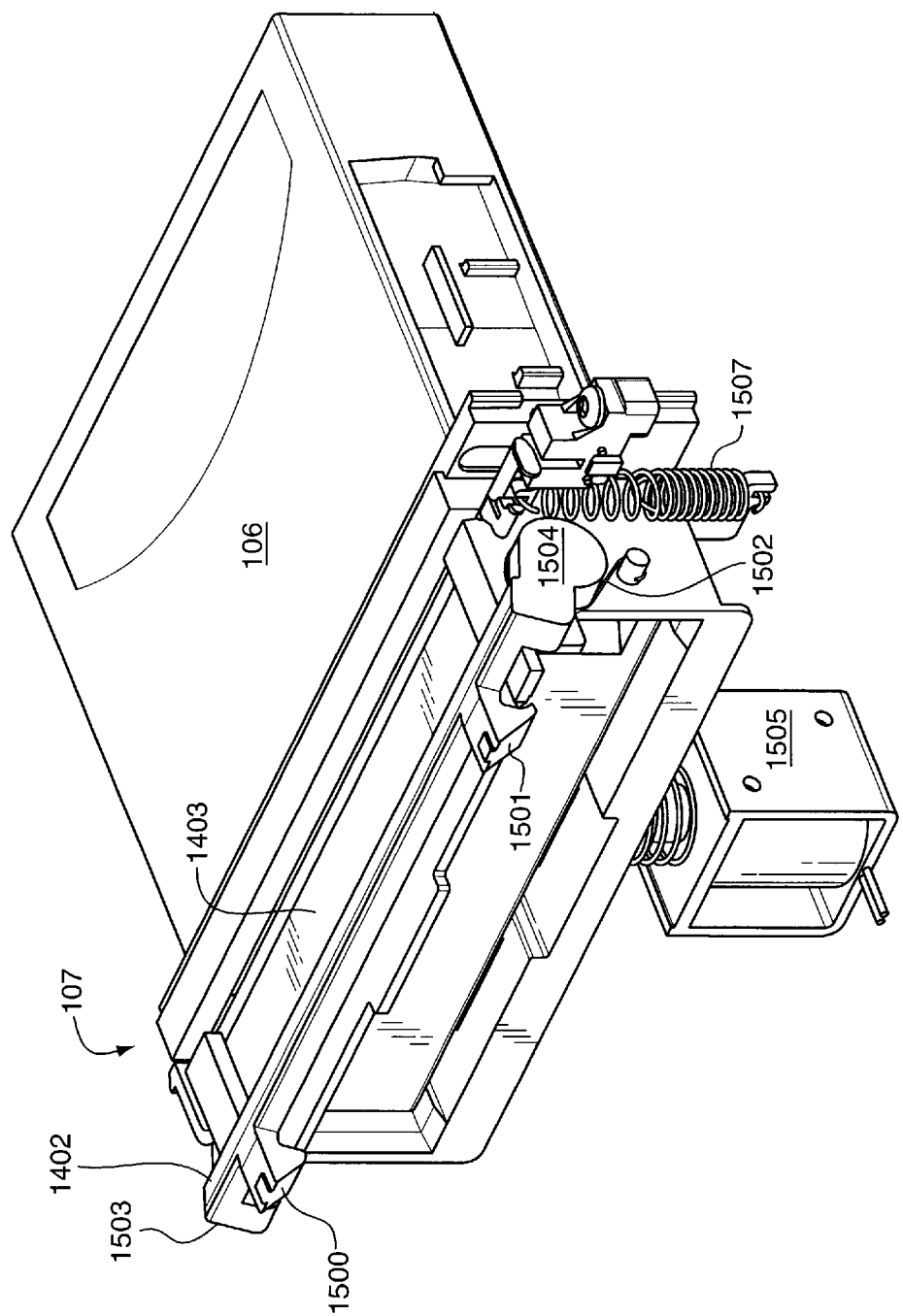
FIG. 32 is a perspective view of the single cartridge interface during operation.
Figure 33:
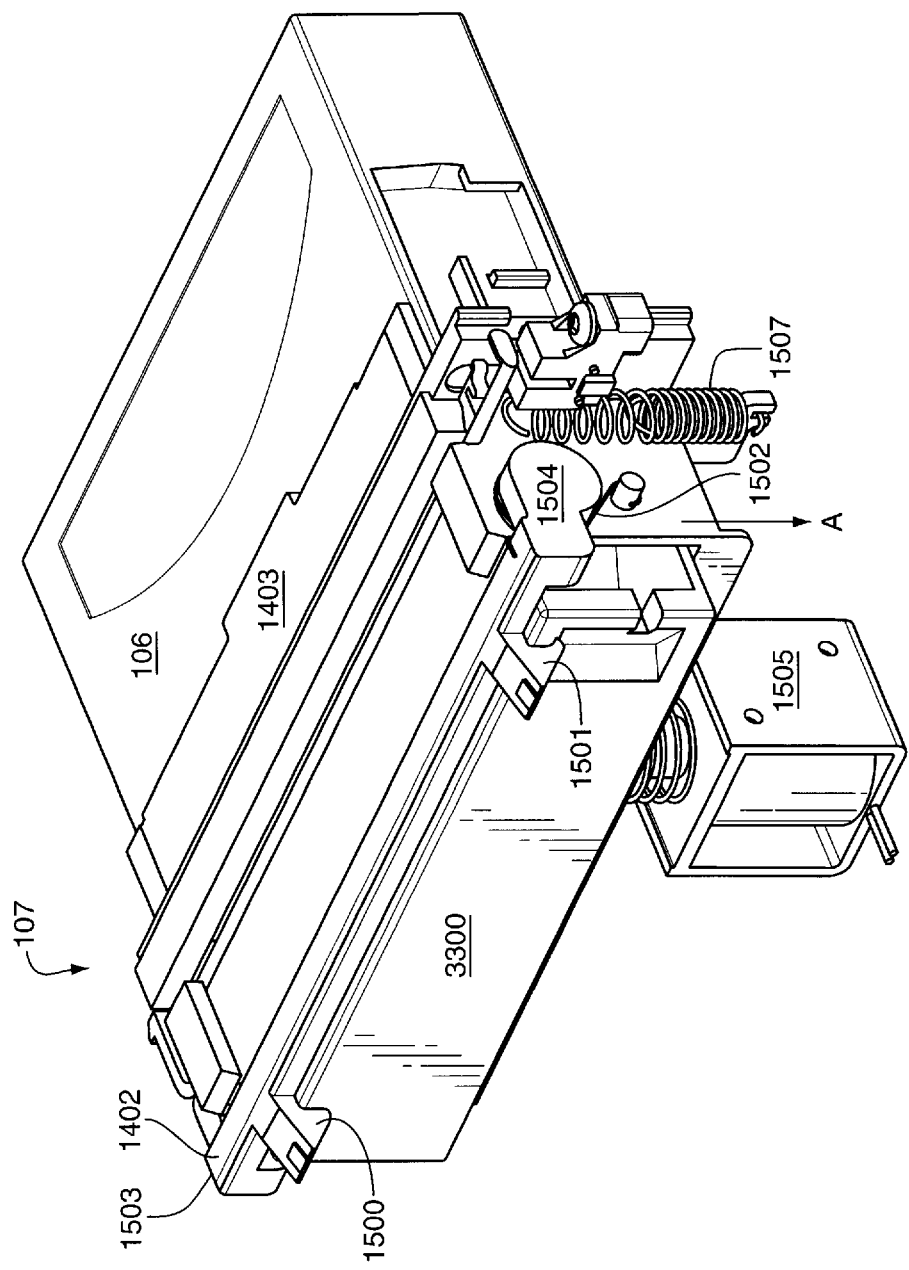
FIG. 33 is another perspective view of the single cartridge interface during operation.

Single Cartridge Interface—FIGS. 14 and 15:

Referring first to FIG. 14, the primary components of the single cartridge interface 107 are a frame 1400, a cartridge stop link 1402, and a door 1403. The door 1403 is connected within a central aperture 1401 in the frame 1400 and pivots both outward and inward as a function of whether the tape cartridge 106 is being ejected from the single cartridge interface 107 or inserted into the single cartridge interface 107 by an operator. When the tape cartridge 106 is inserted into the single cartridge interface 107, the door 1403 pivots inward to engage and raise the cartridge stop link 1402 to permit the tape cartridge 106 to pass under the cartridge stop link 1402 and into position for retrieval by the cartridge picker 102 as illustrated by FIG. 32. When the tape cartridge 106 is ejected from the single cartridge interface 107, the door 1403 pivots outward as it is contacted by the tape cartridge 106 as illustrated by FIG. 33.

Referring to FIG. 15, the cartridge stop link 1402 includes a pair of latch members, 1500 and 1501. As will become apparent from the following description, the latch members, 1500 and 1501, prevent the tape cartridge 106 from being reinserted into the single cartridge interface 107 following an ejection operation. The cartridge stop link 1402 is configured to pivot about its ends, 1503 and 1504, when contacted by the door 1503. The cartridge stop link 1402 also includes a spring 1502 that biases the cartridge stop link 1402 in the direction A against a stop 1508 when not engaged by the door 1403.

The single cartridge interface 107 also includes a solenoid 1505 that controls a doorstop 1506. The doorstop 1506 prevents the door 1403 from pivoting inward and allowing the insertion of the tape cartridge 106 when the cartridge picker 102 is not in position to receive the tape cartridge 106 from the single cartridge interface 107. A spring 1507 biases the door 1403 against the doorstop 1506 in the closed position when the cartridge 106 is not present in the single cartridge interface 107. Advantageously, the doorstop 1506 is located in a recessed portion 1508 and is only retracted during the insertion of the tape cartridge 106 by an operator. During an ejection from the single cartridge interface 107, the tape cartridge 106 passes over the recessed portion 1508 without interference from the doorstop 1506.

Autoloader/library System Operation FIGS. 16–33:

Referring to FIG. 11, when the tape cartridge 106 is exchanged between the cartridge picker 102 and the tape drive 101, or between the cartridge picker 102 and the magazines, 103 and 104, the cartridge 106 is received in the cavity 1116 in direction (A) and ejected from the cavity 1116 in direction (B). In the context of this application this is defined as the front of the turntable 1100 regardless of the exchange port, e.g. 1109, that it is aligned with. Similarly, when the tape cartridge 106 is exchanged between the cartridge picker 102 and the single cartridge interface 107, the cartridge 106 is received in the cavity 1116 from the opposite end in direction (C) and ejected from the cavity 1116 in direction (D). In the context of the present application this is defined as the rear of the turntable 1100 regardless of the exchange port, e.g. 1109, that it is aligned with. As will become apparent from the following description, this permits cartridges to always be oriented in the same direction when they are located in the cavity 1116.

Figure 21:
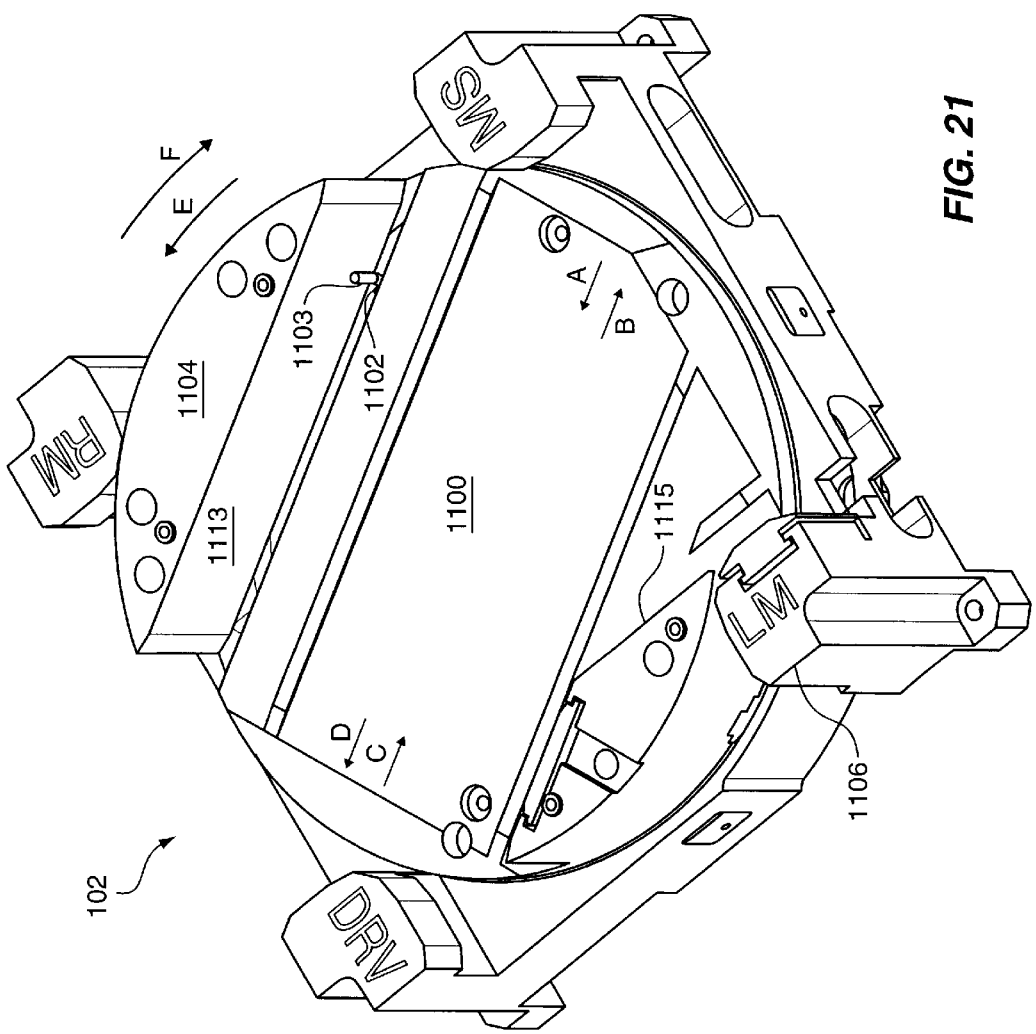
FIG. 21 is a perspective view of the tape cartridge picker during operation.
Figure 22:
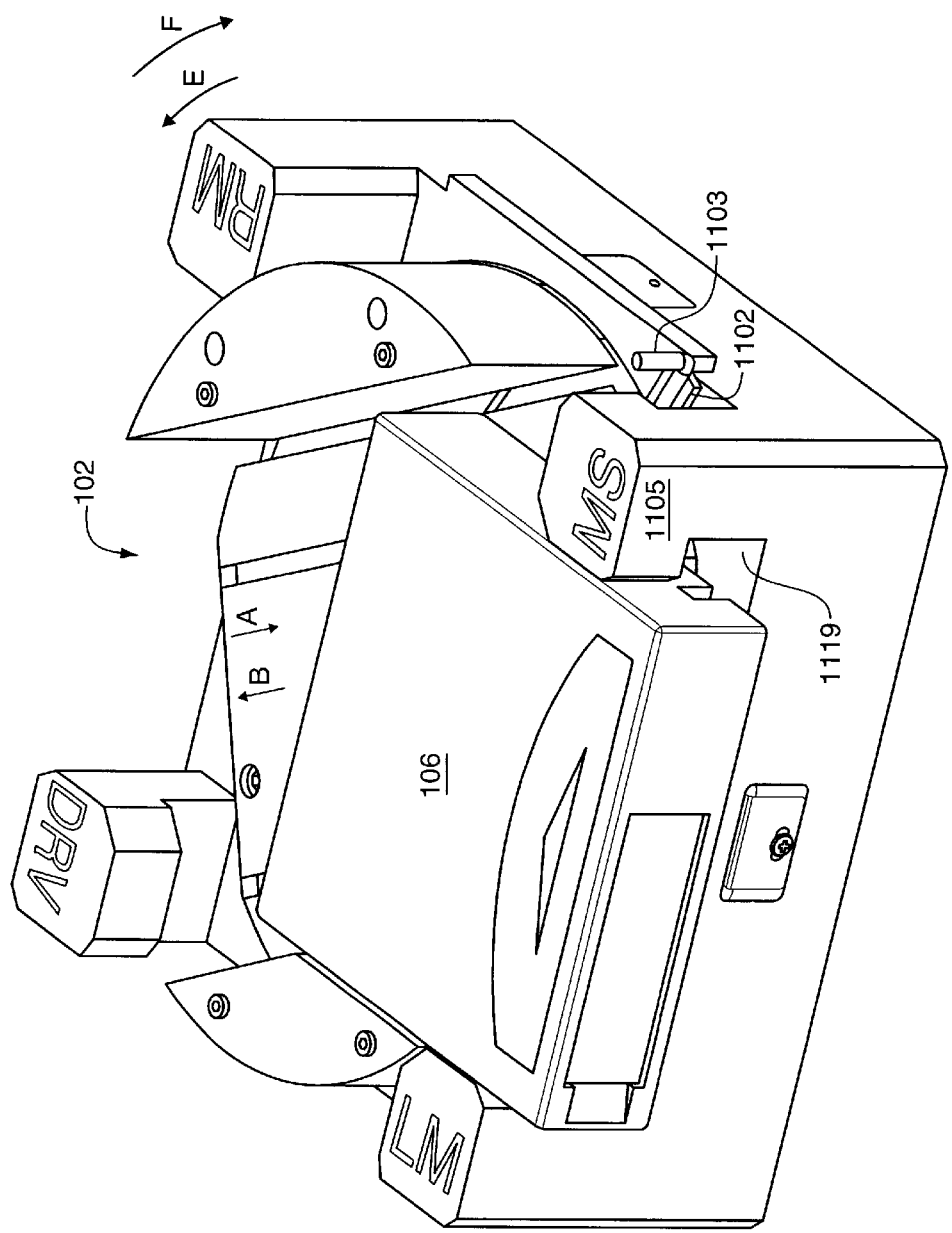
FIG. 22 is another perspective view of the tape cartridge picker during operation.

The translation arm 1102 has three primary positions, but as will also become apparent, other positions are used during the exchange of tape cartridges from the tape drive 101, the single cartridge interface 107 and the magazines, 103 and 104. The first primary position, shown in FIG. 21, is defined as the home position. In the home position, the turntable 1100 is free to rotate regardless of whether the tape cartridge 106 is present in the cavity 1116 or absent from the cavity 1116. Additionally, the home position is used regardless of whether the tape cartridge 106 is received from the front or the rear of the turntable 1100. The second primary position, shown in FIG. 11, is defined as the forward extension position. In the forward extension position, the translation arm 1102 is ready to engage the tape cartridge 106 and pull the cartridge 106 in the direction (A) from the tape drive 101, or the magazines, 103 and 104, into the cavity 1116. The third primary position, shown in FIG. 22, is defined as the reverse extension position. In the reverse extension position, the translation arm 1102 is positioned to engage the tape cartridge 106 and pull the cartridge 106 in the direction (C) from the single cartridge interface 107 into the cavity 1116.

Figure 16:
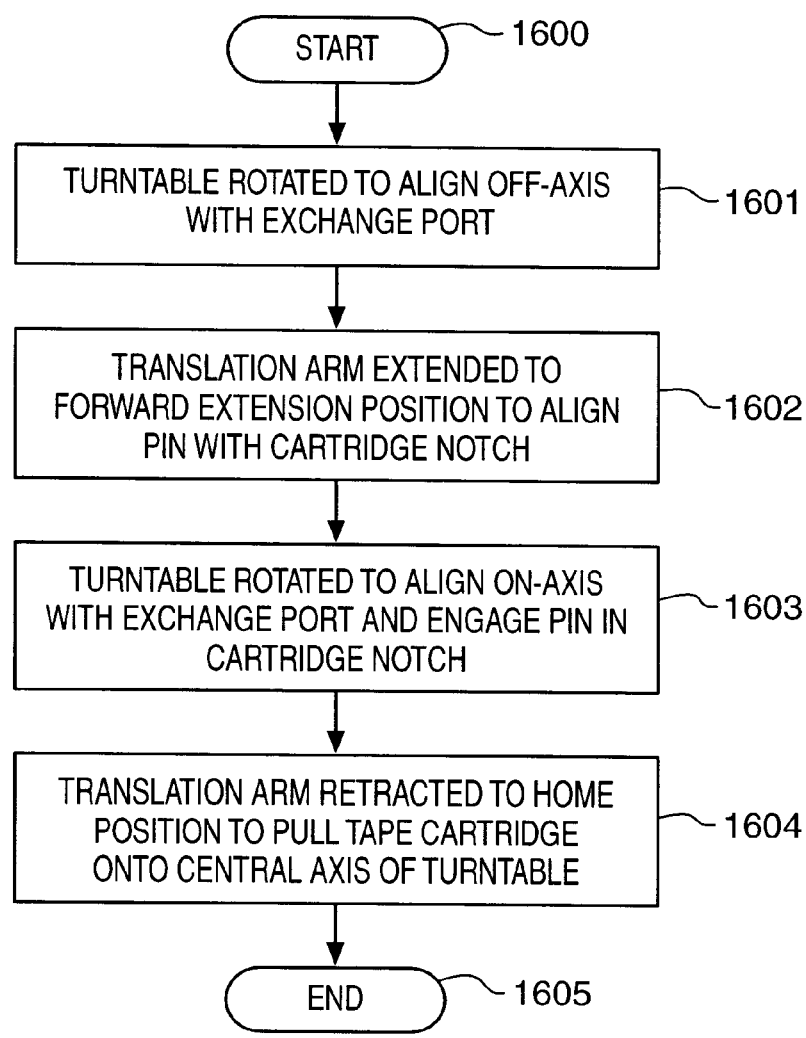
FIG. 16 is a flow chart illustrating an example of the operation of the autoloader library system of the present invention.

FIG. 16 is a flow chart illustrating the operation of the cartridge picker 102 during retrieval of the tape cartridge 106 from the tape cartridge transport magazine 103. Those skilled in the art will appreciate that the operation is substantially identical for retrieval of the tape cartridge 106 from the tape cartridge transport magazine 104 and for retrieval of the tape cartridge 106 following ejection from the tape drive 101.

When one of the tape cartridge transport magazines, 103 or 104, is inserted into the autoloader/library system 100, the autoloader/library system 100 performs an inventory operation to determine which carriages, e.g. 313–316, contain tape cartridges and which carriages are empty. Thus, the autoloader/library system 100 automatically maintains an inventory of loaded tape cartridges during operation. The autoloader/library system 100 also maintains data indicative of the location of specific tape cartridges within the magazines, 103 and 104, so that a desired tape cartridge can be provided to the cartridge picker 102.

Figure 23:
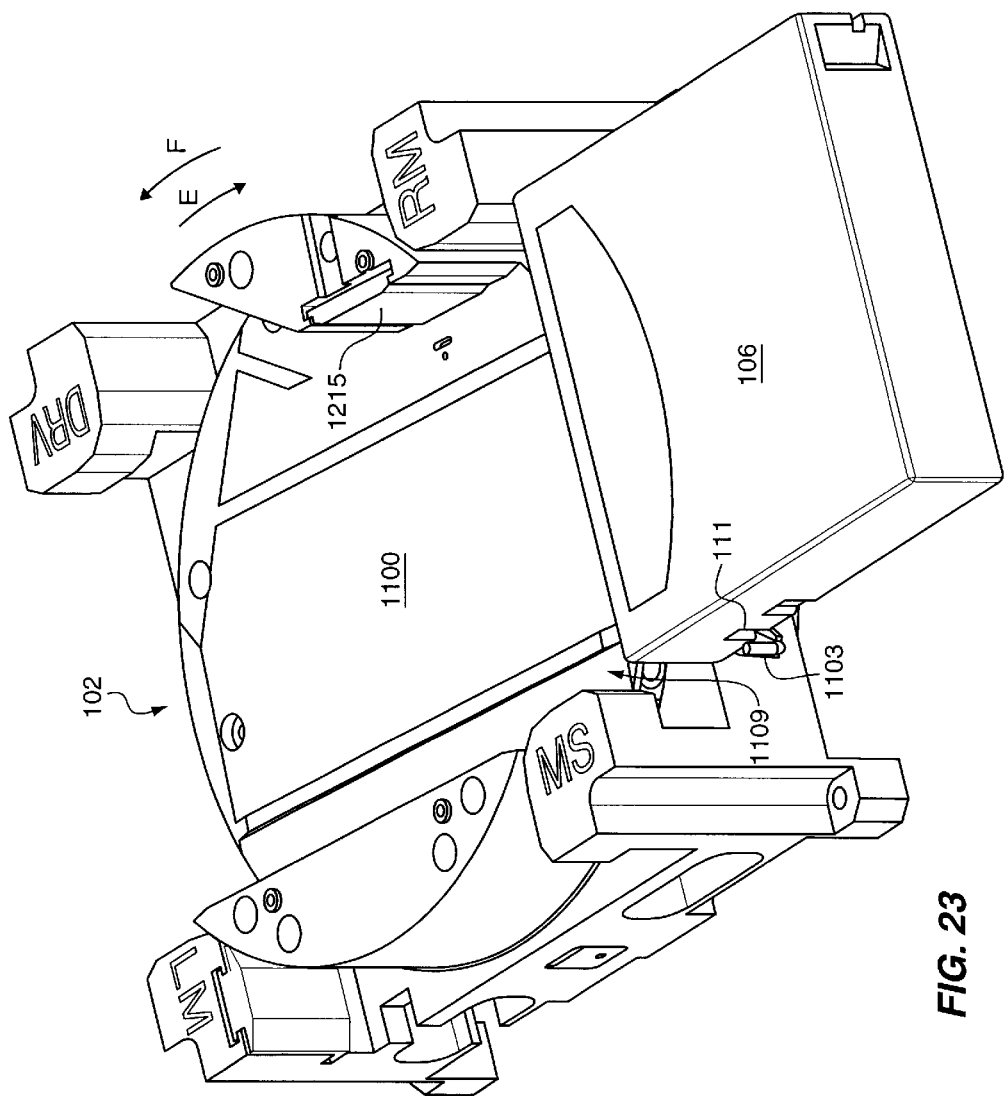
FIG. 23 is another perspective view of the tape cartridge picker during operation.

On FIG. 16 the operation begins at step 1600 with the translation arm 1102 in the home position of FIG. 21. At step 1601, the turntable 1100 is rotated to align off-axis with the exchange port 1109, as shown in FIG. 23. In the context of the present invention, an off-axis alignment is defined as any position of the turntable 1100 where either the rear of the turntable 1100 or the front of the turntable 1100 is not aligned with one of the exchange ports 1109–1112. Similarly, an on-axis alignment is defined as any position of the turntable 1100 where either the rear of the turntable 1100 or the front of the turntable 1100 is aligned with one of the exchange ports 1109–1112. In this case, the off-axis alignment refers to aligning the front of the turntable 1100 approximately three and one half degrees past the exchange port 1109 in the direction (E) and permits extension of the translation arm 1102 to the forward extension position without contacting the tape cartridge 106. Alternatively, the off-axis alignment could be any position that permits the translation arm 1102 to be extended to the forward extension position without contacting the tape cartridge 106.

Figure 24:
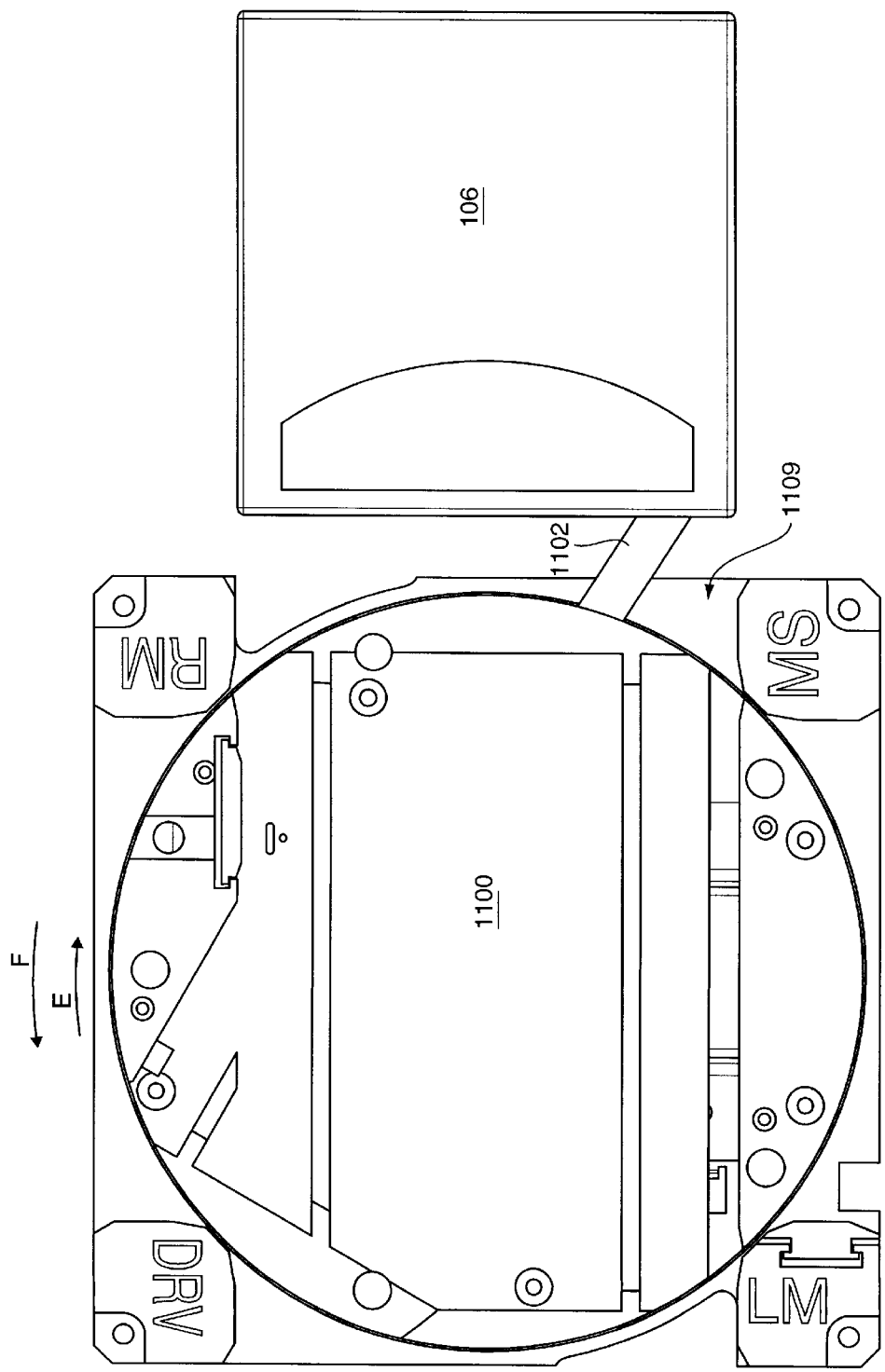
FIG. 24 is another perspective view of the tape cartridge picker during operation.
Figure 25:
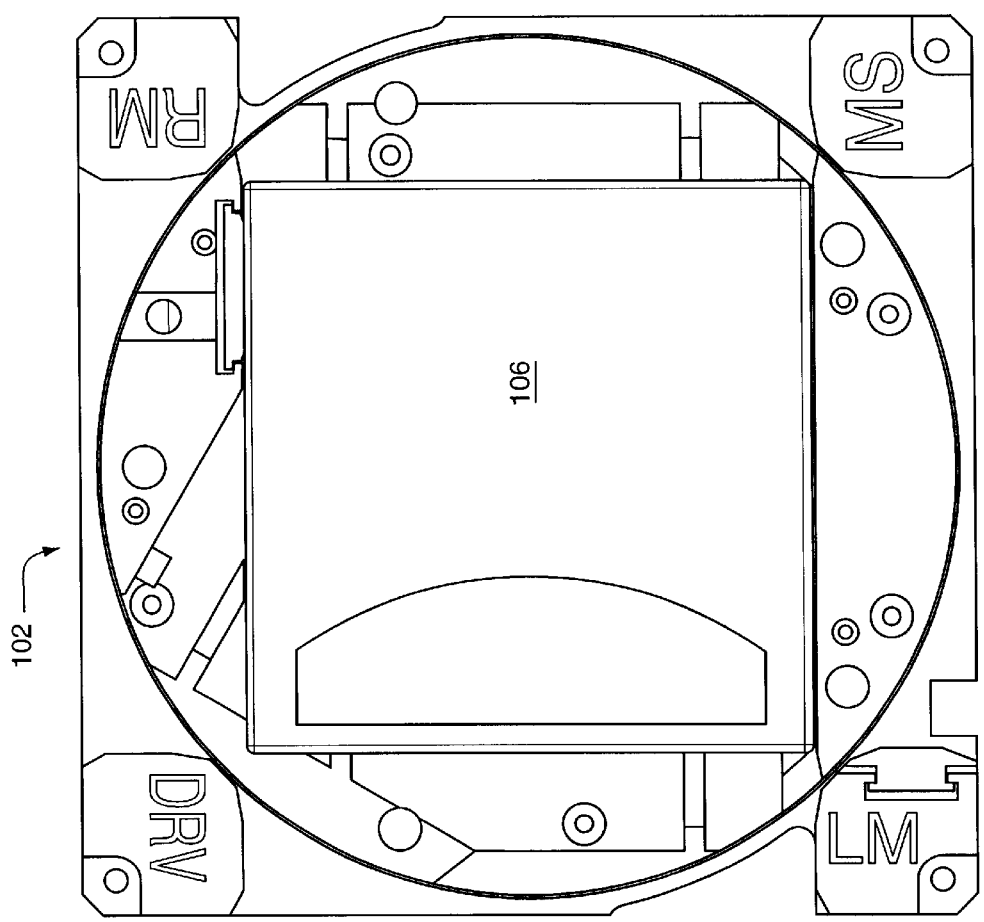
FIG. 25 is another perspective view of the tape cartridge picker during operation.

Substantially simultaneously, the transport magazine 103 transports the carriage, e.g. 313, containing the desired tape cartridge 106 to the storage location aligned with the cartridge picker 102. At step 1602, the translation arm 1102 is extended to the forward extension position so that the pin 1103 is aligned with the cartridge notch 111 in the tape cartridge 106. At step 1603 the turntable is rotated three and one half degrees in the direction (F) to align the front of the turntable 1100 on-axis with the exchange port 1109 and engage or seat the pin 1103 in the cartridge notch 111, as shown in FIG. 24. At step 1604, the translation arm 1102 is retracted to the home position to pull the tape cartridge 106 into the cavity 1116 and onto the central axis of the turntable 1100, as shown in FIG. 25. The operation ends at step 1605. Advantageously, once in this position, the turntable 1100 and cartridge 106 may be freely rotated to deliver the tape cartridge 106 to the tape drive 101, the magazine 104, or the single cartridge interface 107.

Figure 17:
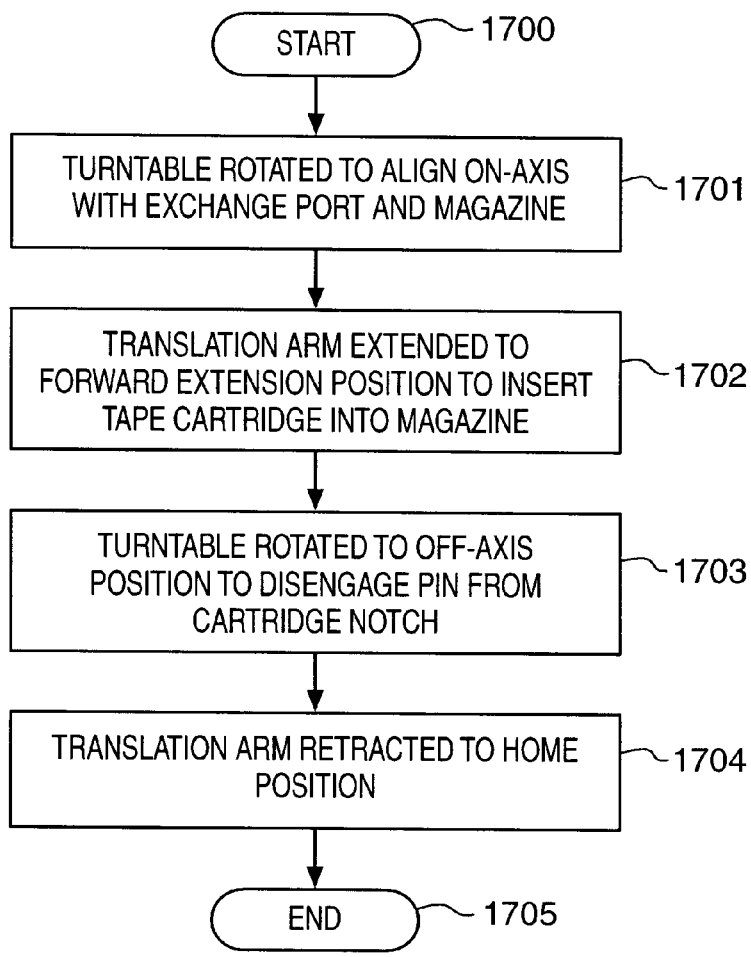
FIG. 17 is a flow chart illustrating another example of the operation of the autoloader library system of the present invention.

FIG. 17 is a flow chart illustrating the delivery of the tape cartridge 106 to the tape cartridge transport magazine 104. Those skilled in the art will appreciate that the operation is substantially identical for delivery of the tape cartridge 106 to the tape cartridge transport magazine 103.

On FIG. 17, the operation begins at step 1700 with the tape cartridge 106 loaded onto the cartridge picker 102 as described in FIG. 16. At step 1701, the turntable 1100 is rotated to align the front of the turntable on-axis with the exchange port 1111 and the tape cartridge magazine 104. Substantially simultaneously, the transport magazine 104 transports an empty carriage, e.g. 314, to the storage location aligned with the cartridge picker 102. At step 1702, the translation arm 1102 is extended to the forward extension position to insert the tape cartridge 106 into the carriage 314 in the tape cartridge magazine 104, as exemplified by the position of the cartridge 106 in FIG. 24. At step 1703, the turntable 1100 is again rotated in the direction (E) to the three and one half degrees off-axis position to disengage the pin 1103 from the cartridge notch 111, as exemplified by the position of the pin 1103 relative to the cartridge notch 111 in FIG. 23. At step 1704, the translation arm 1102 is retracted to the home position, so that the turntable 1100 is free to rotate and perform additional operations. The operation ends at step 1705.

Figure 18:
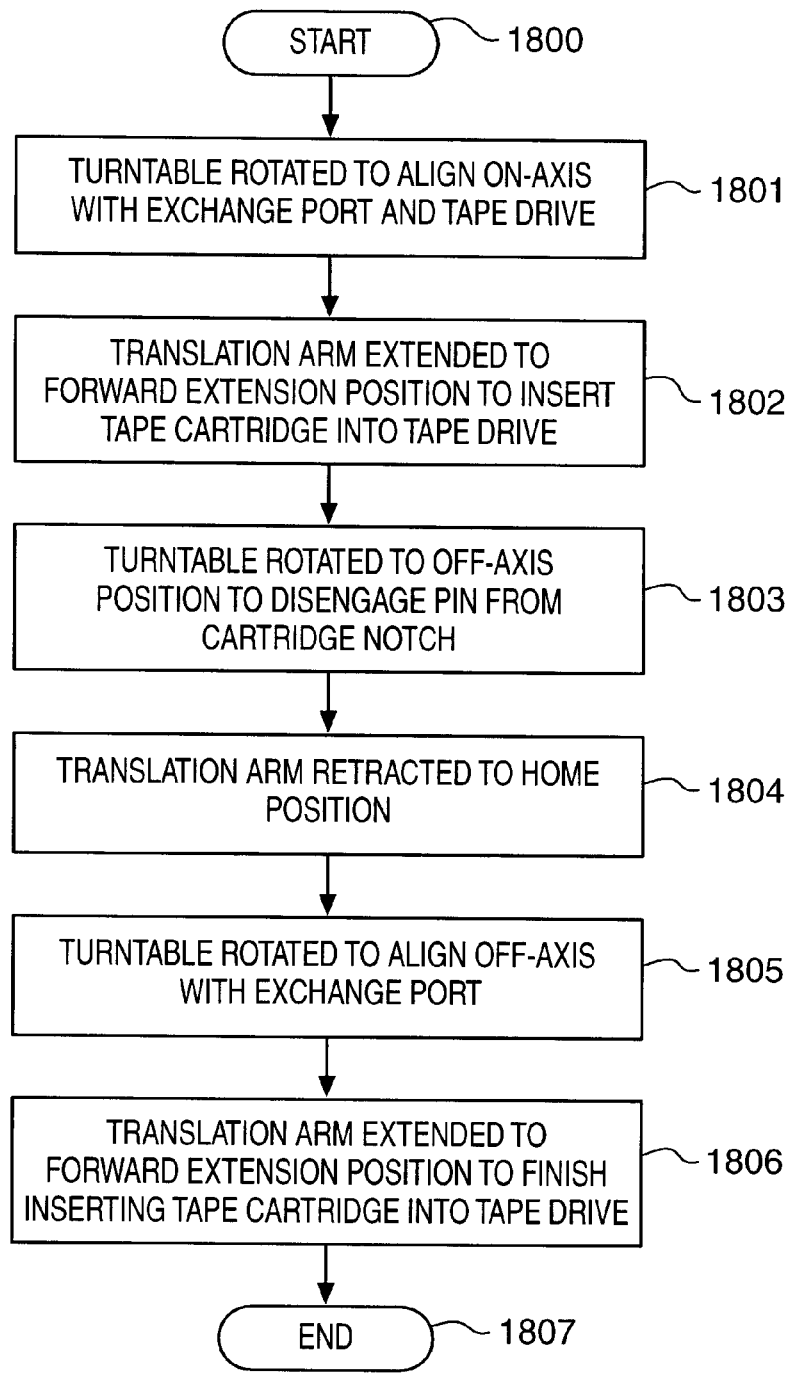
FIG. 18 is a flow chart illustrating another example of the operation of the autoloader library system of the present invention.

FIG. 18 is a flow chart illustrating the delivery of the tape cartridge 106 to the tape drive 101. On FIG. 18, the operation begins at step 1800 with the tape cartridge 106 loaded onto the cartridge picker 102 as described in FIG. 16. At step 1801, the turntable 1100 is rotated to align the front of the turntable 1100 on-axis with the exchange port 1112 and the tape drive 101. At step 1802, the translation arm 1102 is extended to the forward extension position to insert the tape cartridge 106 into the tape drive 101, as exemplified by the insertion shown in FIG. 24. It should be noted that although FIG. 24 shows an insertion through the exchange port 1109 aligned with the magazine 103 the operation is identical for insertion through the port 1112 aligned with the tape drive 101.

Figure 26:
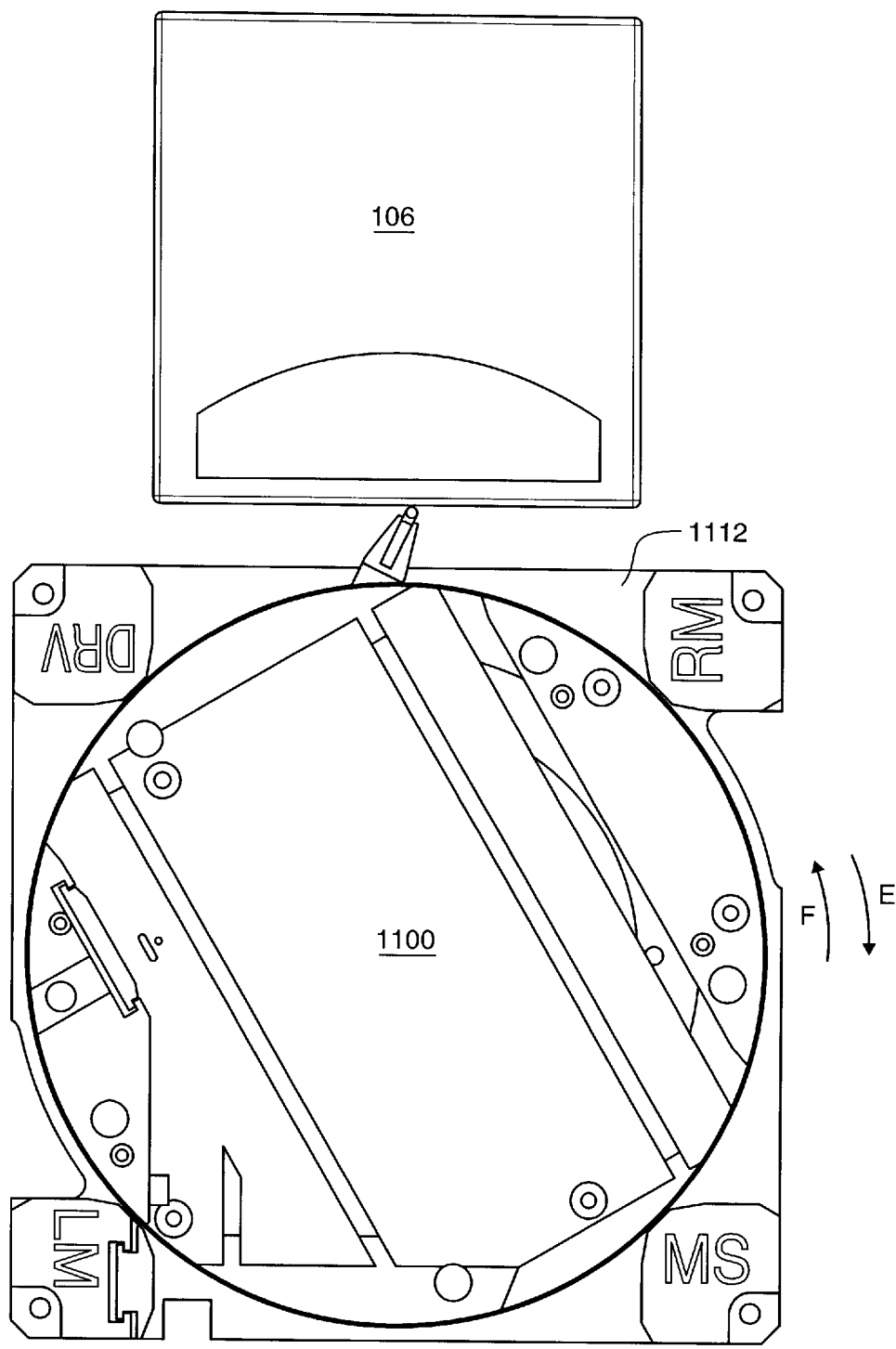
FIG. 26 is another perspective view of the tape cartridge picker during operation.

At step 1802, The tape cartridge 106 is only partially inserted into the tape drive 101 to prevent the translation arm 1102 from contacting the tape drive 101. At step 1803, the turntable 1100 is again rotated in the direction (E) to the three and one half degrees off-axis position to disengage the pin 1103 from the cartridge notch 111, as exemplified by FIG. 23. At step 1804, the translation arm 1102 is retracted to the home position so that the turntable 1100 is free to rotate. Alternatively, the translation arm 1102 only needs to be retracted far enough for the picker 102 to rotate without interference from the cartridge 106. At step 1805, the turntable is rotated in direction (F) so that it is aligned approximately thirty degrees off-axis with the exchange port 1112, and the translation arm 1102 is behind the tape cartridge 106, as shown in FIG. 26. The thirty-degree rotation is not essential, but rather, advantageously adds mechanical advantage and permits the translation arm 1102 to push on the center of the cartridge 106. At step 1806, the translation arm is again extended to the forward extension position to finish inserting the tape cartridge 106 into the tape drive 101. Those skilled in the art will appreciate that because of the thirty-degree off-axis alignment with the exchange port 1112, the forward extension of the translation arm 1102 is now able to complete the insertion of the tape cartridge 106 into the tape drive 101. The operation ends at step 1807.

Figure 19:
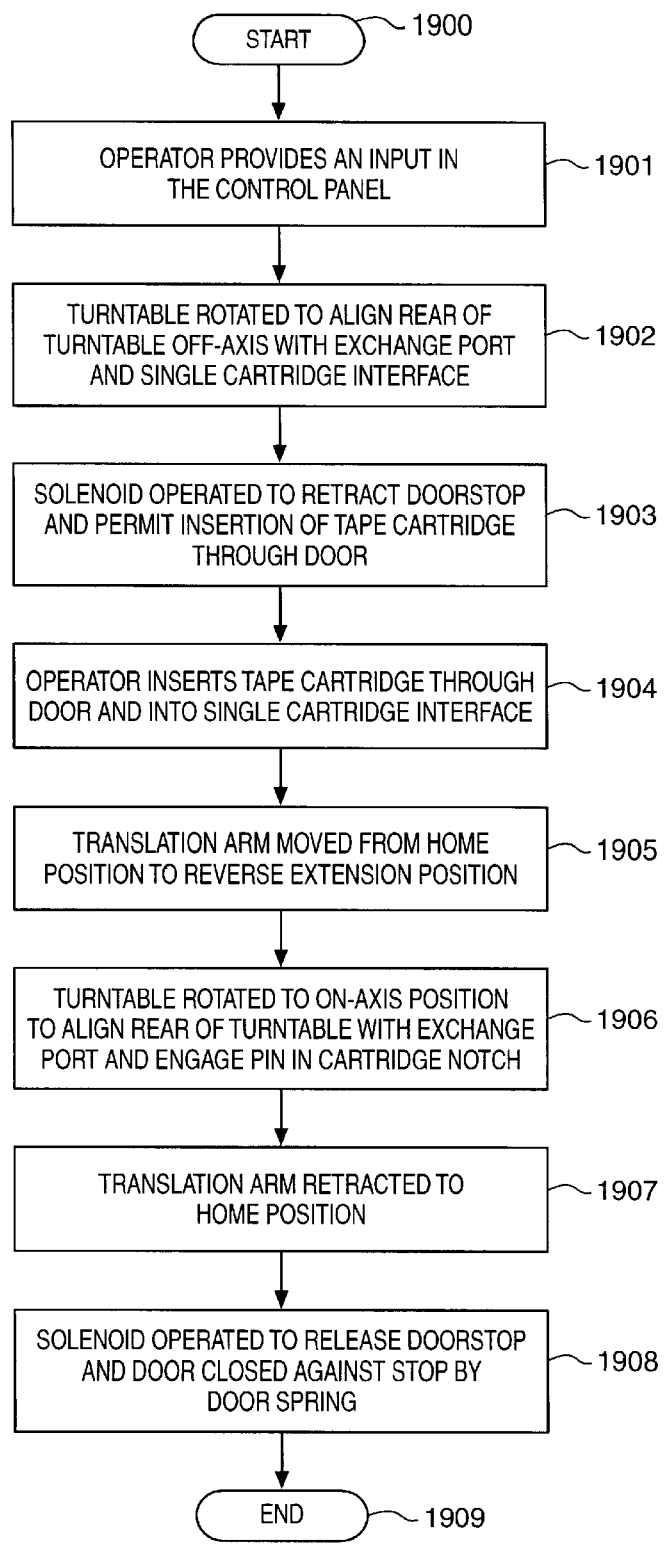
FIG. 19 is a flow chart illustrating another example of the operation of the autoloader library system of the present invention.

FIG. 19 is a flow chart illustrating the receipt of the tape cartridge 106 from an operator into the single cartridge interface 107. On FIG. 19, the operation begins at step 1900. At step 1901, the operator provides an input in the control panel 105. The input indicates to the autoloader/library system 100 that the tape cartridge 106 needs to be received from the single cartridge interface 107. At step 1902, the turntable 300 is rotated in direction (E) to align the rear of the turntable 300 approximately thirty-degrees off-axis with the exchange port 1110 and the single cartridge interface 107, as shown in FIG. 21. It should be noted that at step 1902, the translation arm 302 is in the home position and the wall 1115 is aligned with the column 1106. At step 1903, the solenoid 1505 is operated to retract the doorstop 1506 to permit insertion of the tape cartridge 106 through the door 1403. At step 1904, the operator inserts the tape cartridge 106 through the door 1403 and into the single cartridge interface 107. During insertion, the door 1403 pivots inward and engages the cartridge stop link 1402 raising the cartridge stop link 1402 slightly to permit the tape cartridge 106 to pass under the latch members, 1500 and 1501, as illustrated by FIG. 32.

Figure 27:
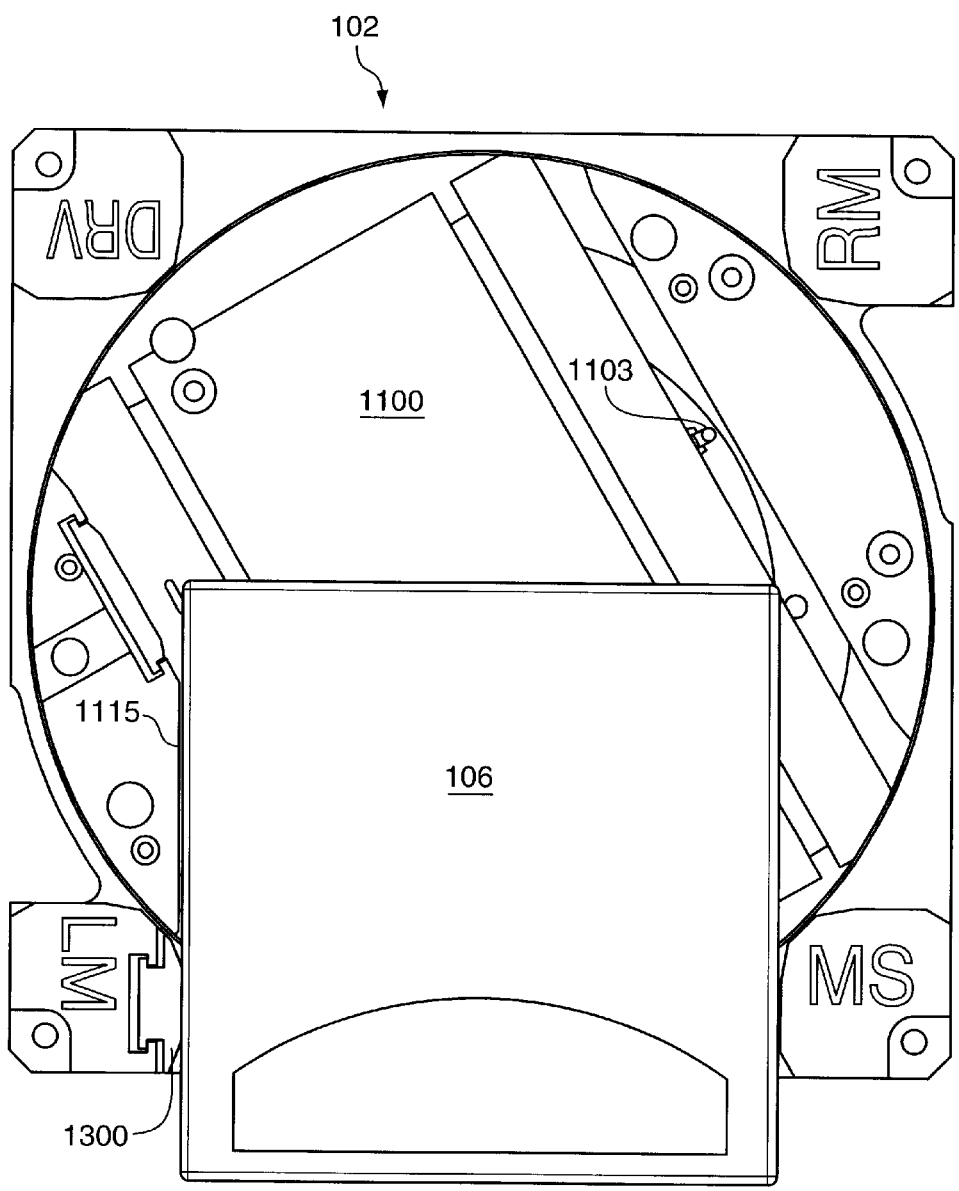
FIG. 27 is another perspective view of the tape cartridge picker during operation.

Referring to FIG. 27 the flex wall 1300 operates to guide the tape cartridge 106 into the cavity 1100 during insertion. Specifically, the flex wall 1300 prevents the tape cartridge 106 from rotating counter clockwise into the wall 1115 and jamming. As the tape cartridge 106 is inserted into the single cartridge interface 107, the key 1215 in the wall 1115, engages a conventional slot defined in the side of the tape cartridge 106. Advantageously, the key 1215 only permits insertion of the tape cartridge 106 into the single cartridge interface 107 in one orientation.

Figure 28:
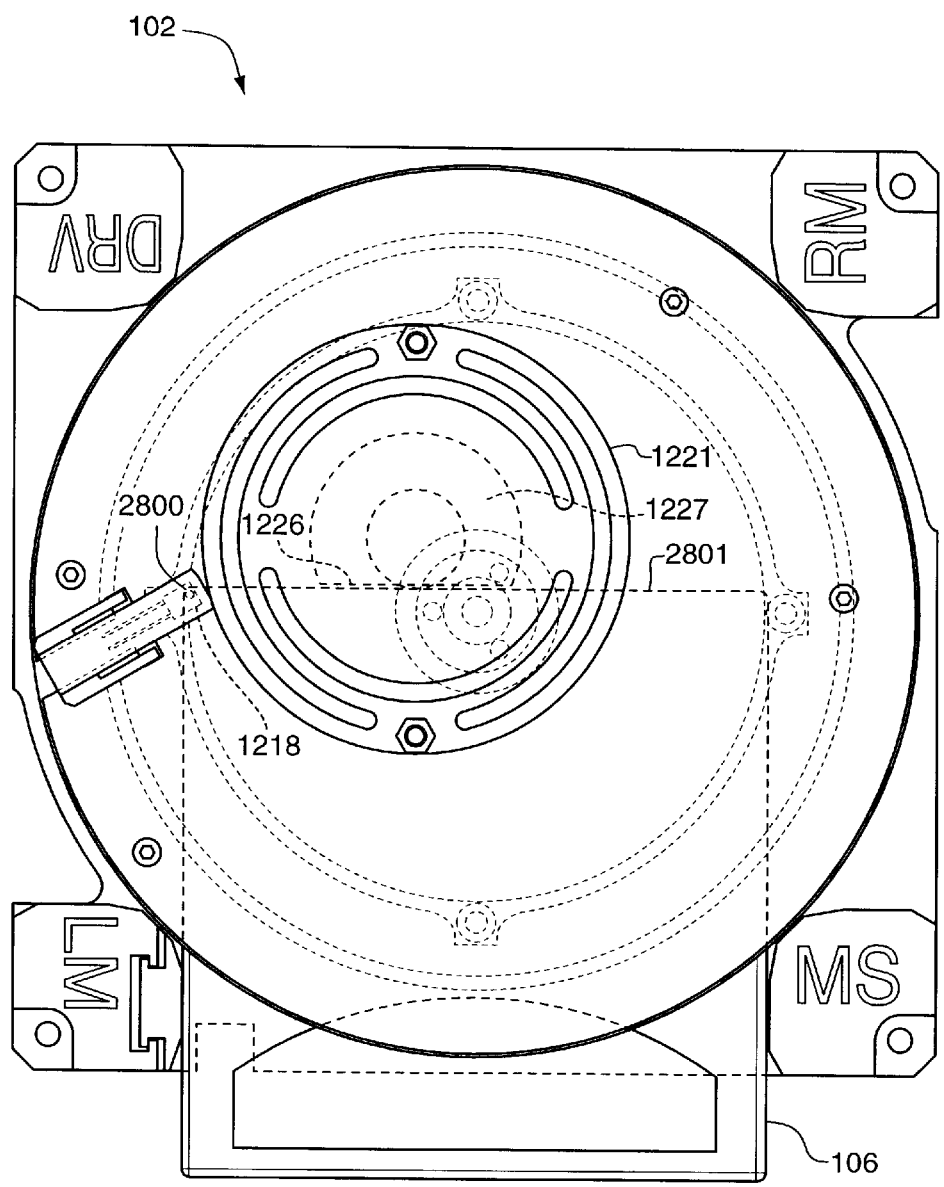
FIG. 28 is another perspective view of the tape cartridge picker during operation.

Referring to FIG. 28, the cartridge stop/compression pad 1221 stops the insertion of the tape cartridge 106 when the face 2801 of the tape cartridge 106 contacts a planer portion 1226 of the cartridge stop/compression pad 1221. In the stopped position, the tape cartridge 106 is positioned so that pin 1103 will align with and engage the cartridge notch 111 when the turntable 1100 is rotated. Advantageously, the cartridge stop/compression pad 1221 only functions to stop the tape cartridge 106 when the turntable 1100 is in the position of FIGS. 27 and 28. In all other positions, the tape cartridge 106 contacts a beveled portion 1227 of the cartridge stop/compression pad 1221 causing the cartridge stop/compression pad 1221 to function as a compression pad and expand vertically upward to permit the cartridge 106 to be fully received into the cavity 1116. Thus, when the cartridge 106 is retrieved from the transport magazines, 103 and 104, or the tape drive 101, the cartridge picker 102 is able to pull the cartridge 106 past the cartridge stop/compression pad 1221 as the compression pad portion of the cartridge stop/compression pad 1221 expands vertically upward.

In the stopped position of FIG. 28, the corner 2800 of the tape cartridge 106 blocks an emitter portion 1218 of a cartridge present sensor to indicate the cartridge present condition. This permits the cartridge picker 102 to automatically sense the cartridge 106 during insertion from the single cartridge interface 107 and begin loading the cartridge 106 into the cavity 1116. Alternatively, the loading could begin in response to an input received in the control panel 105 from the operator.

At step 1905, the translation arm 1102 is moved from the home position to the reverse extension position of FIG. 22. At step 1906, the turntable 1100 is rotated thirty degrees in the direction (F) to the on-axis position to align the rear of the turntable 1100 with the exchange port 1110 and engage or seat the pin 1103 in the cartridge notch 111, as shown in FIG. 29. At step 1907, the translation arm 1102 is retracted to the home position, to pull the tape cartridge 106 into the cavity 1116 and onto the central axis of the turntable 1100. Substantially simultaneously, at step 1908, the solenoid 1505 is again operated to release the doorstop 1506 and the door 1403 is closed against the stop 1506 by the door spring 1507. The operation ends at step 1909. Advantageously, the doorstop 1506 prevents additional tape cartridges from being inserted into the single cartridge interface 107 until the picker 102 is again in position and ready to receive another tape cartridge.

Figure 20:
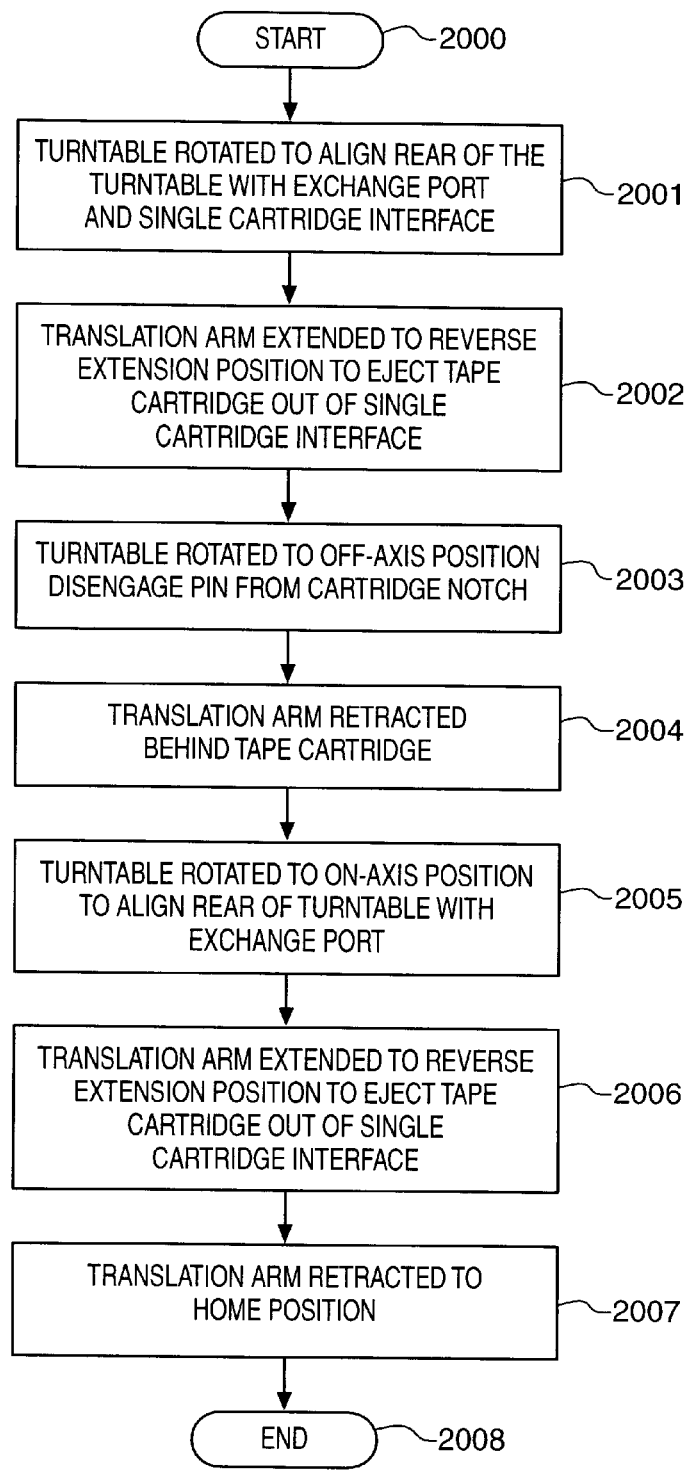
FIG. 20 is a flow chart illustrating another example of the operation of the autoloader library system of the present invention.
Figure 30:
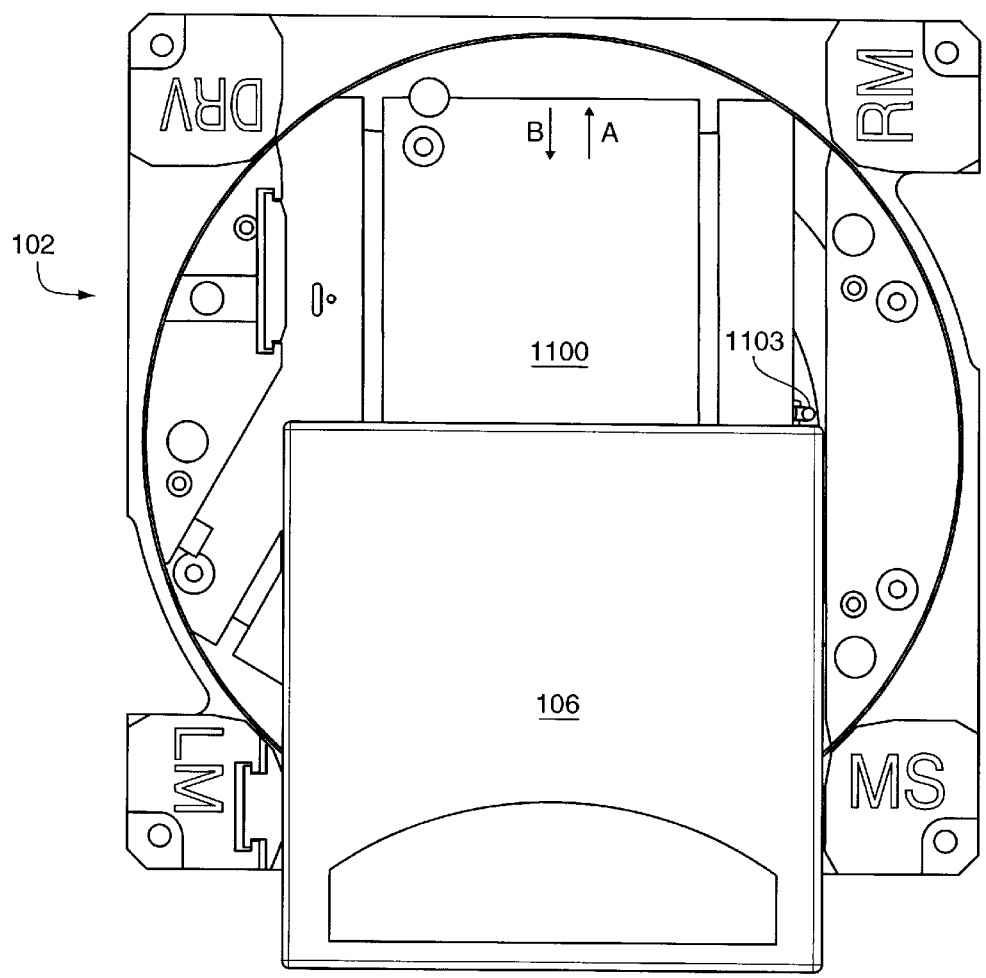
FIG. 30 is another perspective view of the tape cartridge picker during operation.
Figure 31:
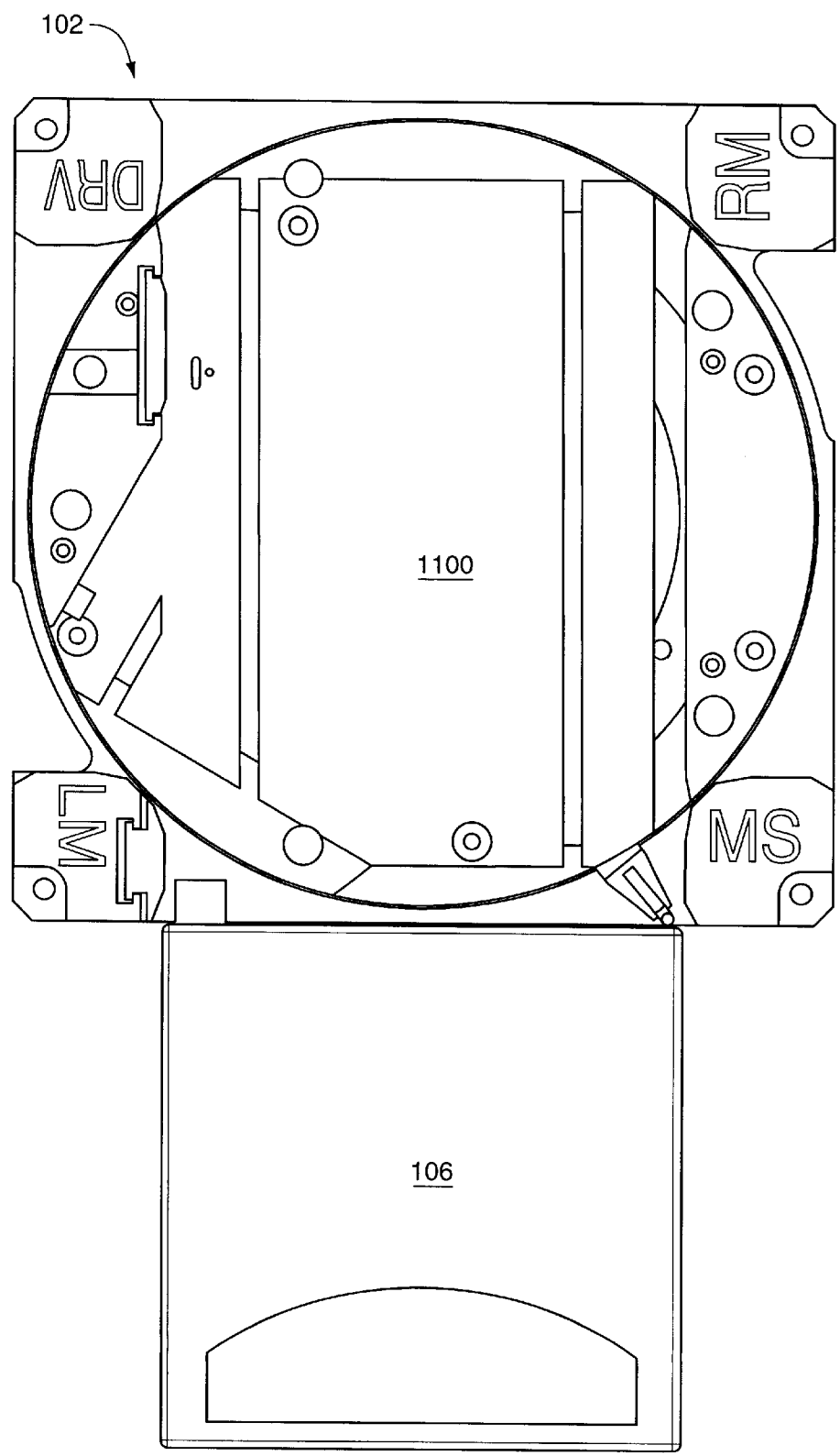
FIG. 31 is another perspective view of the tape cartridge picker during operation.

FIG. 20 is a flow chart illustrating the delivery of the tape cartridge 106 to the single cartridge interface 107. On FIG. 20, the operation begins at step 2000 with the tape cartridge 106 loaded onto the cartridge picker 102 as described in reference to either FIG. 16. At step 2001, the turntable 1100 is rotated to align the rear of the turntable 1100 on-axis with the exchange port 1110 and the single cartridge interface 107. At step 2002, the translation arm 1102 is extended to the reverse extension position to eject the tape cartridge 106 out of the single cartridge interface 107 as exemplified by the extension in FIG. 24. At step 2003, the turntable 1100 is again rotated in the direction (E) to the thirty-degree off-axis position to disengage the pin 1103 from the cartridge notch 111, as shown in FIG. 22. At step 2004, the translation arm 1102 is retracted to a position behind the cartridge 106. At step 2105, the turntable 1100 is rotated in the direction (F) to the on-axis position so that the rear of the turntable is aligned with the exchange port 1110 and the translation arm 1102 is behind the tape cartridge 106, as shown in FIG. 30. At step 2006, the translation arm 1102 is again extended to a reverse extension, as shown in FIG. 31, to eject the tape cartridge 106 further out of the single cartridge interface 107 so that the cartridge 106 is in the frame 1400 of the single cartridge interface 107 as shown in FIG. 33. During the ejection, the tape cartridge 106 contacts the beveled portion of the latches, 1500 and 1501, causing the cartridge stop link 1402 to pivot upward and the latches, 1500 and 1501, to slide across the top of the tape cartridge 106. As the cartridge 106 clears the cartridge stop link 1402, the spring 1502 biases the cartridge stop link 1402 in the direction A to secure the latch members, 1500 and 1501, onto the back 3300 of the cartridge 106 as shown in FIG. 33.

Advantageously, in this position, the cartridge stop link 1402 prevents the reinsertion of the tape cartridge 106 back into the single cartridge interface 107. The cartridge 106 can only be reinserted by removing the cartridge 106 from the single cartridge interface 107, and repeating the steps of FIG. 19 to recall the picker 102 and release the doorstop 1506. Also advantageously, the cartridge 106 remains in the single cartridge interface 107 for retrieval by the operator and the cartridge picker 102 is free to perform additional operations in the autoloader/library system 100. It should be noted that during the ejection, the doorstop 1506 in the recessed portion 1508 does not interfere with the tape cartridge 106. At step 2007 the translation arm is retracted to home position and the operation ends at step 2008.

Figure 34:
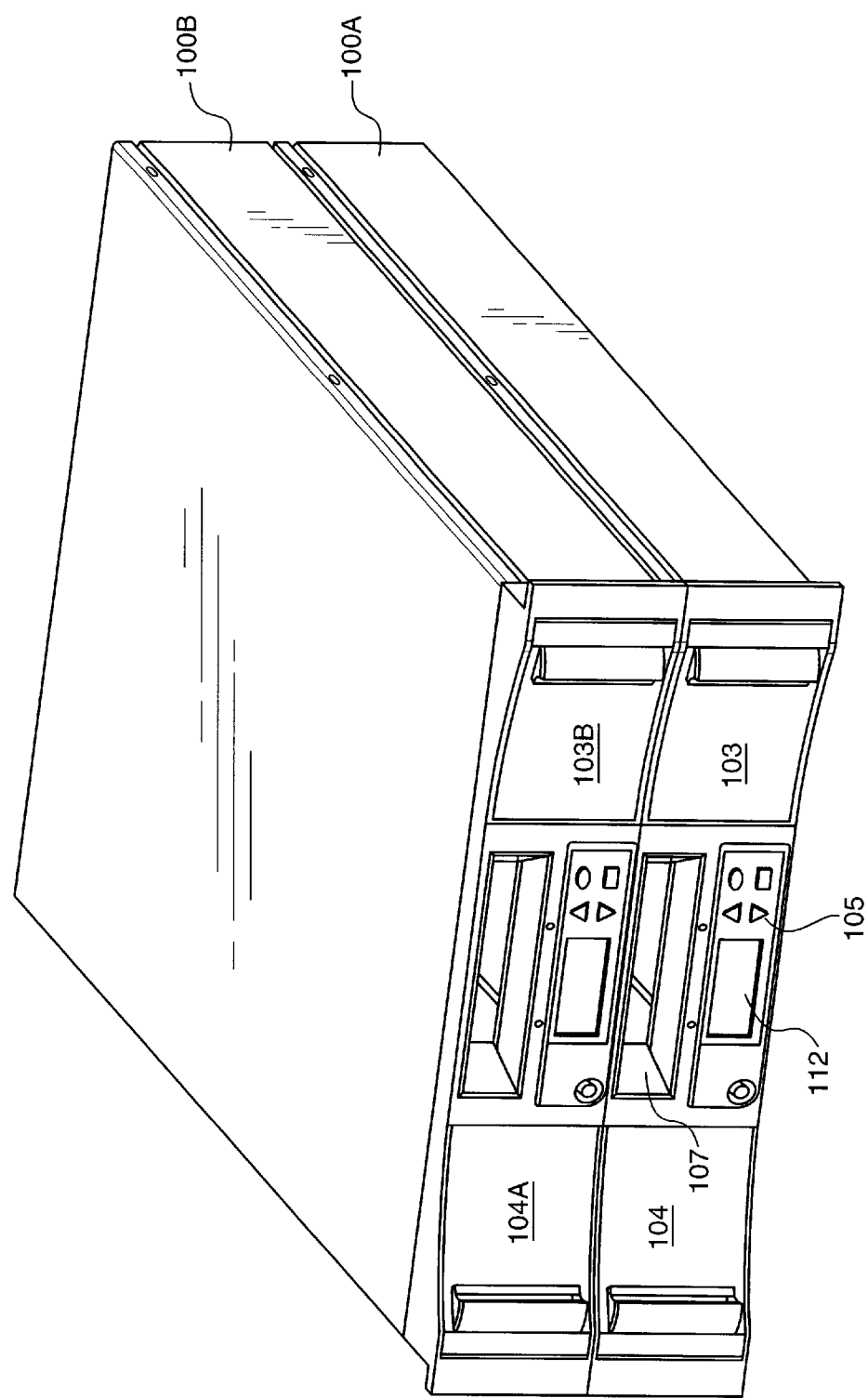
FIG. 34 illustrates a stacked configuration of the autoloader/library system according to the present invention.

Expansion of Tape Autoloader/Library Systems—FIG. 34:

FIG. 34 illustrates multiple autoloader library systems in a stacked configuration. Those skilled in the art will appreciate that an infinite number of autoloader library systems could be stacked although only library systems 100(*a*) and 100(*b*) are shown on FIG. 34 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(*a*) and 100(*b*) can share individual tape cartridges, e.g. 106, to provide efficient load balancing and performance between the coupled autoloader/library systems. The coupled autoloader/library systems 100(*a*) and 100(*b*) could each include a cartridge picker 102, tape cartridge transport magazines, 103 and 104, a tape drive 101, and a single cartridge interface 107, or could share elements such as the cartridge picker 102, the single cartridge interface and/or the tape drive 101. Alternatively, a single cartridge picker 102 configured with an elevator mechanism could serve both autoloader/library systems 100(*a*) and 100(*b*). In addition, the coupled autoloader/library systems 100(*a*) and 100(*b*) could each include an individual control panel 105 and interface 112 or could share a single control panel, e.g. 105, and interface, e.g. 112. In the case where the library systems, e.g. 100, are coupled, the cartridge picker 102 is configured to not only rotate but is also configured to elevate within the multiple library systems, 100(*a*) and 100(*b*), to access magazines, 103(*a*) and 104(*b*).

In another example, the library systems, 100(*a*) and 100(*b*), could share the single cartridge interface 107. In this case the single cartridge interface 107 is configured with an elevator mechanism to transport the single cartridge interface 107 in the vertical direction between the multiple library systems, 100(*a*) and 100(*b*). Operationally, the cartridge picker 102 in the system 100(*a*) could pass tape cartridges to the single cartridge interface 107. The single cartridge interface 107 then elevates to the system 100(*b*) where the tape cartridge is automatically passed to a cartridge picker, e.g. 100, in the system 100(*b*). The cartridge picker in the system 100(*b*) could then exchange the tape cartridge with the tape drive, e.g. 101 or the magazines, 103(*a*) and 103(*b*), in the system 100(*b*). Cartridges could also be passed from the system 100(*b*) to the system 100(*a*) in a similar manner. Thus, the autoloader/library system 100 is customizable to a variety of applications with the capability of expansion at any time to provide both increased capacity and/or increased performance.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. An automated tape cartridge autoloader library system comprising:
   a first tape cartridge magazine configured to interface with a first magazine port and comprising a first plurality of tape cartridge storage locations for receiving and managing a first plurality of tape cartridges;
   a second tape cartridge magazine configured to interface with a second magazine port and comprising a second plurality of tape cartridge storage locations for receiving and managing a second plurality of tape cartridges;
   at least one tape drive;
   a tape cartridge picker configured to exchange the first and second plurality of tape cartridges between the first and second tape cartridge magazines, and the at least one tape drive; and
   a rectangular case that houses the first and second tape cartridge magazine in the first and second magazine ports, the at lout one tape drive, the tape cartridge picker, wherein the rectangular case comprises:
      a form actor less than or equal to three and one half inches in height and configured to fit into a tape library rack mount.

2. The system of claim 1 further comprising:
   a single tape cartridge interface configured to exchange an individual one of the first and second plurality of tape cartridges between the tape cartridge picker and an operator.

3. The system of claim 2 wherein the tape cartridge picker comprises:
   a turntable configured to rotate about a central axis of rotation to interface with the at least one tape drive, the single cartridge interface, and the first and second tape cartridge magazine;
   a cavity configured to receive the individual one of the first and second plurality of tape cartridges, the cavity being defined in the turntable and located substantially about the central axis of rotation and;
   means fox loading the individual one of the first and second plurality of tape cartridges into the cavity from the at least one tape drive, the single cartridge interface, and the first and second tape cartridge magazine, wherein once loaded, the individual one of the first and second plurality of tape cartridges is positioned in the cavity about the central axis of rotation.

4. The system of claim 3 wherein the cartridge picker further comprises:
   means for unloading the individual one of the first and second plurality of tape cartridges from the cavity into the at least one tape drive, the single cartridge interface, and the first and second tape cartridge magazine.

5. The system of claim 4 wherein the loading means and the unloading means comprise:
   a translation arm; and
   a pin integrally formed and perpendicularly orientated to the translation arm.

6. The system of claim 5 wherein unloading the tape cartridge from the cavity into the single cartridge interface is representative of, aligning the turntable with the single cartridge interface, extending the translation arm horizontally relative to the turntable to insert the tape cartridge into the single cartridge interface, disengaging the pin from a corresponding feature in the tape cartridge, and retracting the translation arm horizontally relative to the turntable.

7. The system of claim 6 wherein loading the tape cartridge from the single cartridge interface into the cavity is representative of, aligning the turntable with the single cartridge interface, extending the translation arm horizontally relative to the turntable to engage the pin in the corresponding feature in to tape cartridge and retracting the translation arm horizontally relative to the turntable to pull the tape cartridge into the cavity.

8. The system of claim 6 wherein loading the tape cartridge from the first and second tape cartridge magazines and the at least one tape drive into to cavity, is representative of aligning the turntable with one of the first and second tape cartridge magazines and the at least one tape drive, extending the translation arm horizontally relative to the turntable to engage the pin in the corresponding feature in the tape cartridge, and retracting to translation arm horizontally relative to the turntable tape the tape cartridge into the cavity.

9. The system of claim 6, wherein unloading the tape cartridge from the cavity to one of the first and second tape cartridge magazines and the at least one tape drive, is representative of aligning the turntable with one of the first and second tape cartridge magazines and the at least one tape drive, extending the translation arm horizontally relative to the turntable to insert the tape cartridge into the at least one storage location and the at least one tape drive, disengaging the pin from the corresponding feature in the tape cartridge, and retracting the translation aim horizontally relative to the turntable.

10. The system of claim 3 wherein the cartridge picker further comprises:
   a stationary picker base, wherein the turntable rotates about the central axis of rotation within the stationary picker base.

11. The system of claim 2 further comprising: a control panel comprising:
   a user interface configured to receive commands from the operator that control operation of the automated tape cartridge autoloader library system;
   a display configured to display status formation for the operator.

12. The system of claim 2 wherein the single tape cartridge interface comprises:
   a frame;
   a door pivotally connected to the frame, wherein the door pivots in a first direction when a tape cartridge in inserted by the operator into the tape cartridge picker through the single tape cartridge interface, and pivots in a second direction when a tape cartridge is ejected from the tape cartridge picker through the single tape cartridge interface;
   a doorstop that prevents the door from pivoting in the first direction without preventing the door from pivoting in the second direction; and
   a solenoid connected to the doorstop, wherein the solenoid retracts the doorstop to allow the door to pivot in the first direction.

13. The system of claim 12 wherein to mingle tape cartridge interface further comprises:
   a cartridge stop link having a latch with a beveled portion; and
   a spring connected to the cartridge stop link,
   wherein when the tape cartridge is being ejected from the tape cartridge picker through the single tape cartridge interface, the tape cartridge contacts the beveled portion of the latch to pivot the cartridge stop link and bias the spring, and
   wherein when the tape cartridge has cleared the cartridge stop link, the spring pivots the cartridge stop link to position the latch to prevent the tape cartridge from being reinserted.

14. The system of claim 13 wherein when the tape cartridge is inserted by to operator into the tape cartridge picker through the single tape cartridge interface, the door pivots to engage the cartridge stop link and to pivot the cartridge stop link to permit the insertion of the tape cartridge into the taps cartridge picker.

15. The of claim 1 wherein the first tap cartridge magazine comprises in a transport configured plurality of tape cartridges first vertical closed loop within the first tape cartridge magazine; and wherein the second tape cartridge magazine comprises a second transport mechanism configured to transport the second plurality of tape cartridges in a second vertical closed loop within the second tape cartridge magazine.

16. The system of claim 15 further comprising:
   at least one bar code reader configured to read computer readable indicia on the first and second plurality of tape cartridges as the first and second plurality of tape cartridges are transported within the first and second tape cartridge magazine.

17. The system of claim 15 wherein the first plurality of storage locations comprises;
   a first plurality of individual carriages connected to the first transport mechanism and configured to receive the first plurality of tape cartridges, and wherein the second plurality of storage locations comprise:
   a second plurality of individual carriages connected to the second transport mechanism and configured to receive to second plurality of tape cartridges.

18. The system of claim 17 wherein the first transport mechanism comprises: at least one first drive gear configured to mate with a first drive motor; and
   a first belt connected to the first plurality of individual carriages and the at least one first drive gear; and wherein the second transport mechanism comprises:
   at least one second drive gear configured to mate with a second drive motor; and
   a second belt connected to the second plurality of individual carriages and the at least one second drive gear.

19. The system of claim 18 further comprising:
   guide tracks located at opposite ends of the first and second tape cartridge magazines;
   a plurality of mounting assemblies, each of the plurality of individual carriages is rotatably connected to one of the plurality of mounting assemblies, wherein each of the plurality of mounting assemblies comprises:
   a pair of wheeled apparatus that travel in a pair of opposing tracks; and
   a bar connected to the pair of wheeled apparatus.

20. The system of claim wherein the pair of opposing tracks includes:
a pair of upper tracks; and
a pair of lower tracks, wherein the pair of wheeled apparatus travels into pair of upper tracks, then rotate about the bar to travel in the lower tracks.

21. The system of claim 19 further comprising:
a fastener connected to the bolt;
a bearing connected to the fastener; and
an aperture connected to the bearing, wherein the bearing rotates in to aperture, and wherein the aperture is defined in one of the pair of wheeled apparatus.

22. The system of claim 18 wherein the drive gear includes a handle for manually rotating drive gear.

23. The system of claim 17 wherein the first and second tape cartridges magazines include guide tracks located at opposite ends of the first and second tape cartridge magazines, wherein each of the first and second plurality of individual carriages include a wheel at opposite ends of the individual carriage, and wherein the wheel travels in the guide tracks to guide the individual carriage.

24. The system of claim 1 wherein the first tape cartridge magazine is configured to slidably interface with the second magazine port in the case and the second tape cartridge transport magazine is configured to slidably interface with the first magazine port in the case.

25. The system of claim 1 wherein the first plurality of storage locations in the first tape cartridge magazine comprises eight tape cartridge storage locations and the second plurality of storage locations in the second tape cartridge transport magazine comprises eight tape cartridge storage locations.

26. A method of operating an automated tape cartridge autoloader library system the method comprising:
loading a first plurality of tape cartridges into a first tape cartridge magazine;
loading a second plurality of tape cartridges into a second tape cartridge magazine;
loading an individual one of the first and the second plurality of tape cartridges into a cartridge picker;
rotating the cartridge picker to deliver, the individual one of the first and the second plurality of tape cartridges to one of a tape drive, a single cartridge interface, and the first and second tape cartridge magazine,
wherein the tape drive, the single cartridge interface, and the first and second tape cartridge magazines are housed in a rectangular case having a form factor less than or equal to three and one half inches in height and configured to fit into a tape library rack mount; and
unloading the tape cartridge from the cartridge picker into one of the tape drive single cartridge interface and the first and second tape cartridge magazine.

27. The method of claim 26 the method further comprising:
transporting the first plurality of tape cartridges within the first tape cartridge magazine in a first vertical closed loop to position an individual one of the first plurality of tape cartridges for loading into the cartridge picker;
loading the individual one of the first plurality of tape cartridges into the cartridge picker;
rotating the cartridge picker to deliver the individual one of the first plurality of tape cartridges to one of the tape drive, the single cartridge interface, and the second tape cartridge magazine; and
unloading the tape cartridge from the cartridge picker into the one of the tape drive, the single cartridge interface, and the second tape cartridge magazine.

28. The method of claim 27 the method further comprising:
responsive to loading the individual one of the first and second plurality of tape cartridges into the cartridge picker from one of the tape drive, the single cartridge interface, and the second tape cartridge magazine;
rotating the cartridge picker to deliver the individual one of the first and second plurality of tape cartridges to the first tape cartridge magazine; and
transporting a first empty tape cartridge storage location within the first tape cartridge magazine in the first vertical closed loop to position the first empty tape cartridge storage location for receipt of the individual one of the first and second plurality of tape cartridges from the cartridge picker; and
unloading the tape cartridge from the cartridge picker into the first empty tape cartridge storage location.

29. The method of claim 27 the method further comprising:
responsive to loading the individual one of the first and second plurality of tape cartridges into the cartridge picker from one of the single cartridge interface, and the first and second tape cartridge magazine;
rotating the cartridge picker to deliver the individual one of the first and second plurality of tape cartridges to the tape drive; and
unloading to tape cartridge from the cartridge picker into the tape drive.

30. The method of claim 27 the method further comprising:
responsive to loading the individual one of the first and second plurality of tape cartridges into the cartridge picker from one of the tape drive and the first and second tape cartridge magazine;
rotating the cartridge picker to deliver the individual one of the first and second plurality of tape cartridges to the single cartridge interface; and
unloading the tape cartridge from the cartridge picker into the single cartridge interface.

31. The method of claim 26 method further comprising:
transporting the second plurality of tape cartridges within the second plurality of tape cartridge magazine in a second vertical closed loop to position an individual one of the second tape cartridges for loading into the cartridge picker loading the individual one of the second plurality of tape cartridges into the cartridge picker;
rotating the cartridge picker to deliver the individual one of the second plurality of tape cartridges to one of the tape drive, the single cartridge interface, and the first tape cartridge magazine; and
unloading the tape cartridge from the cartridge picker into the one of the tape drive, the single cartridge interface, and the first tape cartridge magazine.

32. The method of claim 31 the method further comprising:
responsive to loading the individual one of the first and second plurality of tape cartridges into the cartridge picker from one of the tape drive and the single cartridge interface, and the first tape cartridge magazine;
rotating the cartridge picker to deliver the individual one of the first and second plurality of tape cartridges to the second tape cartridge magazine; and
transporting a second empty tape cartridge storage location within the second tape cartridge magazine in the second vertical, closed loop to position the second empty tape cartridge storage location for receipt of the individual one of the first and second plurality of tape cartridges from the cartridge picker; and unloading the tape cartridge from the cartridge picker into the second empty tape cartridge storage location.

33. The method of claim 26 the method further comprising:

transporting the plurality of tape cartridges on a plurality of individual carriages in a vertical closed loop between an upper and a lower portion of the first tape cartridge magazine;

guiding the plurality of individual carriages using guide tracks located at opposite ends of to first tape cartridge transport magazine;

transporting the plurality of tape cartridges on a plurality of individual carriages in a vertical closed loop between an upper and a lower portion of the second tape cartridge magazine; and guiding the plurality of individual carriages using guide tracks located at opposite ends of the second tape cartridge transport magazine.

34. The method of claim 33 further comprising:

preventing insertion of a tape cartridge into to single cartridge interface when the tape cartridge picker is not positioned to receive the tape cartridge.

* * * * *

UNITED STATES PATENT AND TRADEMARK OFFICE
CERTIFICATE OF CORRECTION

PATENT NO. : 6,693,759 B2
DATED : February 17, 2004
INVENTOR(S) : Owens et al.

It is certified that error appears in the above-identified patent and that said Letters Patent is hereby corrected as shown below:

Column 18,
Line 34, please replace "the at lout one tape…" with -- the at least one tape…. --
Line 36, please replace "actor" with -- factor --
Line 55, please repalce "fox loading" with -- for loading…. --
Line 58, please replace "cartridge magazine…" with -- cartridge magazines…. --

Column 19,
Line 4, please replace "orientated" with -- oriented…. --
Line 18, please replace "feature in to…" with -- feature in the…. --
Line 23, please replace "into to cavity…" with -- into the cavity… --
Line 28, please replace "retracting to…" with -- retracting the… --
Line 29, please replace "turntable tape the tape…" with -- turntable to pull the tape….--
Line 40, please replace "translation aim…" with -- translation arm… --
Line 52, please replace "formation" with -- information…. --
Line 59, please replace "cartridge in…" with -- cartridge is…. --

Column 20,
Line 4, please replace "wherein to mingle" with -- wherein the single --
Line 18, please replace "inserted by to…." with -- inserted by the…. --
Line 22, please replace "the taps…." with -- the tape…. --
Line 23, please replace "The of claim 1 wherein the first tap cartridge magazine comprises in a transport configured plurality of tape cartridges first vertical closed loop…." with -- The system of claim 1 wherein the first tape cartridge magazine comprises: a first transport mechanism configured to transport the first plurality of tape cartridges in a first vertical closed loop… --
Line 45, please replace "receive to second plurality…." with -- receive the second plurality… --

Column 21,
Line 1, please replace "The system of claim…." with -- The system of claim 19… --
Line 5, please replace "….apparatus travels into pair…." with -- apparatus travels in the pair… --
Line 8, please replace "bolt" with -- belt --
Line 11, please replace "in to aperture…" with -- in the aperture…. --
Line 14, please replace "….rotating drive gear." with -- rotating the drive gear --
Line 16, please replace "tape cartridges…" with -- tape cartridge… --
Line 41, please replace "to deliver, the" With -- to deliver the… --
Line 44, please replace "magazine" with -- magazines --
Line 52, please replace "magazine." with -- magazines --

UNITED STATES PATENT AND TRADEMARK OFFICE
CERTIFICATE OF CORRECTION

PATENT NO. : 6,693,759 B2
DATED : February 17, 2004
INVENTOR(S) : Owens et al.

It is certified that error appears in the above-identified patent and that said Letters Patent is hereby corrected as shown below:

Column 22,
Lines 6, 23 and 34, please replace "magazine;" with -- magazine: --
Line 27, please replace "….unloading to tape cartridge…" with -- unloading the tape cartridge…. --
Line 45, please replace "picker loading" with -- picker: loading --
Line 61, please replace ""magazine;" with -- magazine --

Column 23,
Line 13, please replace "…..ends of to…." with -- ends of the…. --

Column 24,
Line 10, please replace "to single…" with -- the single --

Signed and Sealed this

Seventh Day of September, 2004

JON W. DUDAS
*Director of the United States Patent and Trademark Office*